US012627227B2

(12) United States Patent
Ge et al.

(10) Patent No.: US 12,627,227 B2
(45) Date of Patent: May 12, 2026

(54) SWITCHED-BUS BASED RESONANT SWITCHED-CAPACITOR CONVERTER ARCHITECTURE

(71) Applicant: THE REGENTS OF THE UNIVERSITY OF CALIFORNIA, Oakland, CA (US)

(72) Inventors: Ting Ge, Union City, CA (US); Zichao Ye, Santa Clara, CA (US); Yicheng Zhu, Berkeley, CA (US); Robert C.N. Pilawa-Podgurski, Berkeley, CA (US)

(73) Assignee: THE REGENTS OF THE UNIVERSITY OF CALIFORNIA, Oakland, CA (US)

( * ) Notice: Subject to any disclaimer, the term of this patent is extended or adjusted under 35 U.S.C. 154(b) by 415 days.

(21) Appl. No.: 18/334,254

(22) Filed: Jun. 13, 2023

(65) Prior Publication Data

US 2023/0412073 A1　　Dec. 21, 2023

Related U.S. Application Data

(60) Provisional application No. 63/354,143, filed on Jun. 21, 2022.

(51) Int. Cl.
　　*H02M 3/07*　　　(2006.01)
　　*H02M 1/00*　　　(2006.01)
　　*H02M 3/00*　　　(2006.01)

(52) U.S. Cl.
　　CPC ........... *H02M 3/07* (2013.01); *H02M 1/0058* (2021.05); *H02M 1/007* (2021.05); *H02M 3/01* (2021.05)

(58) Field of Classification Search
　　CPC .......... H02M 3/07; H02M 3/01; H02M 3/077; H02M 1/0058; H02M 1/007; Y02B 70/10
　　See application file for complete search history.

(56) References Cited

U.S. PATENT DOCUMENTS 7,746,041　B2　　6/2010　Xu
2021/0367511　A1*　11/2021　Liu .......................... H02M 3/07
(Continued)

FOREIGN PATENT DOCUMENTS

CN　　　116191881　A　*　5/2023　.......... H02M 3/1582

OTHER PUBLICATIONS

Shehabi, Arman et al., "United states data center energy usage report," Lawrence Berkeley National Laboratory, Berkeley, CA, Techical Report LBNL-1005775, Jun. 2016, pp. 1-67.
(Continued)

*Primary Examiner* — Jue Zhang
*Assistant Examiner* — Jye-June Lee
(74) *Attorney, Agent, or Firm* — O'BANION & RITCHEY LLP; John P. O'Banion

(57) ABSTRACT

A cascaded converter architecture comprising a pure switched-capacitor (SC) stage and a resonant SC stage. Multiple switching buses are utilized to connect the first-stage SC converter with second-stage multi-phase resonant SC converters. The flying capacitors of both stages are resonant with the output inductors, so the charge distribution loss is eliminated. Zero-current switching is realized by adjusting the duty ratio and switching frequency. By using the intermediate switching bus, the number of switches can be reduced, and the intermediate bus capacitor is not required; thereby greatly reducing component count and cost while improving power density. Numerous implementation variations are described by way of example and not limitation.

27 Claims, 23 Drawing Sheets

(56) References Cited

U.S. PATENT DOCUMENTS

2022/0368218 A1\* 11/2022 Liu ......................... H02M 3/07
2023/0396144 A1\* 12/2023 Ge ......................... H02M 3/07
2024/0128864 A1\*  4/2024 Ye ......................... H02M 3/07

OTHER PUBLICATIONS

Li, Xin et al., "Google 48V Rack Adaptation and Onboard Power Technology Update," in Open Compute Project (OCP) 2019 Summit, Mar. 14-15, 2019.
Ahmed, Mohamed H. et al., "Gan based high-density unregulated 48 v to x v llc converters with 98% efficiency for future data centers," in PCIM Europe 2019; International Exhibition and Conference for Power Electronics, Intelligent Motion, Renewable Energy and Energy Management, May 9, 2019, pp. 1-8.
Lei, Yutian et al., "Split-phase control: Achieving complete soft-charging operation of a dickson switched capacitor converter," IEEE Transactions on Power Electronics, vol. 31, No. 1, Jan. 2016, pp. 770-782.
Liu, Wen Chuen et al., "Bi-lateral energy resonant converter (BERC) with merged two-stage inductor for 48-to-12v applications," in 2020 IEEE 21st Workshop on Control and Modeling for Power Electronics (COMPEL), 2020, pp. 1-6.
Ye, Zichao et al., "The cascaded resonant converter: A hybrid switched-capacitor topology with high power density and efficiency," IEEE Transactions on Power Electronics, vol. 35, No. 5, 2020, pp. 4946-4958.
Jiang, Shuai et al., "Switched tank converters," in 2018 IEEE Applied Power Electronics Conference and Exposition (APEC), Mar. 2018, pp. 1-15.
Pilawa-Podgurski, Robert C.N. et al., "Merged two-stage power converter architecture with soft charging switched-capacitor energy transfer," in 2008 IEEE Power Electronics Specialists Conference, Jun. 2008, pp. 4008-4015.
Pilawa-Podgurski, Robert C.N. et al., "Merged two-stage power converter with soft charging switched-capacitor stage in 180 nm cmos," IEEE Journal of Solid-State Circuits, vol. 47, No. 7, Jul. 2012, pp. 1557-1567.
Lei, Yutian et al., "A general method for analyzing resonant and soft-charging operation of switched-capacitor converters," IEEE Transactions on Power Electronics, vol. 30, No. 10, Oct. 2015, pp. 5650-5664.
Ye, Zichao et al., "A 48-to-12 v cascaded resonant switched-capacitor converter for data centers with 99% peak efficiency and 2500 w/in3 power density," in 2019 IEEE Applied Power Electronics Conference and Exposition (APEC), 2019, pp. 13-18.
Ge, Ting et al., "A 48-to-12 v cascaded resonant switched-capacitor converter achieving 4068 w/in3 power density and 99.0% peak efficiency," in 2021 IEEE Applied Power Electronics Conference and Exposition (APEC), 2021, pp. 1959-1965.
Ge, Ting et al., "A 48-to-12 V Cascaded Multi-Resonant Switched Capacitor Converter with 4700 W/in3 Power Density and 98.9% Efficiency," 2021 IEEE Energy Conversion Congress and Exposition (ECCE), 2021, pp. 1959-1965.

\* cited by examiner

First stage, 2-to-1
N = 2, K = 2

Second stage, 2-to-1
M = 2

First stage, 4-to-1
N = 4, K = 4

Second stage, 2-to-1
M = 2

First stage, 4-to-1
N = 4, K = 2

Second stage, 2-to-1
M = 2

N = 4, K = 2

State ③

ZVS turn on of $S_{4A}$ at $t_0 + T_d$

ZVS turn on of $S_{3B}$ at $t_1 + T_d$

State ①

ZVS turn on of $S_{3A}$ at $t_2 + T_d$

ZVS turn on of $S_{4B}$ at $t_3 + T_d$

State ③

ZCS turn off of $S_{1A}$ at $t_4$
ZCS turn on of $S_{4B'}$ at $t_4+T_d$
ZVS turn on of $S_{3A'}$ at $t_4+T_d$ ZVS turn on of $S_{1B}$ at $t_5+T_d$ State ②

ZVS turn on of $S_{4A'}$ at $t_6 + T_d$

ZCS turn off of $S_{4B'}$ at $t_7$
ZCS turn on of $S_{1A}$ at $t_7 + T_d$
ZVS turn on of $S_{3B'}$ at $t_7 + T_d$

SWITCHED-BUS BASED RESONANT SWITCHED-CAPACITOR CONVERTER ARCHITECTURE

CROSS-REFERENCE TO RELATED APPLICATIONS

This application claims priority to, and the benefit of, U.S. provisional patent application Ser. No. 63/354,143 filed on Jun. 21, 2022, incorporated herein by reference in its entirety.

STATEMENT REGARDING FEDERALLY SPONSORED RESEARCH OR DEVELOPMENT

This invention was made with Government support under Award Number DE-AR0000906, awarded by the U.S. Department of Energy, Advanced Research Projects Agency-Energy (ARPA-E). The Government has certain rights in the invention.

NOTICE OF MATERIAL SUBJECT TO COPYRIGHT PROTECTION

A portion of the material in this patent document may be subject to copyright protection under the copyright laws of the United States and of other countries. The owner of the copyright rights has no objection to the facsimile reproduction by anyone of the patent document or the patent disclosure, as it appears in the United States Patent and Trademark Office publicly available file or records, but otherwise reserves all copyright rights whatsoever. The copyright owner does not hereby waive any of its rights to have this patent document maintained in secrecy, including without limitation its rights pursuant to 37 C.F.R. § 1.14.

BACKGROUND

1. Technical Field

The technology of this disclosure pertains generally to bus voltage converters, and more particularly to a cascaded converter architecture using multiple switching buses to connect a first-stage converter with second-stage converters.

2. Background Discussion

Cloud-based computing, powering neural networks, memory storage, block chain computing, and high bandwidth communications show continued growth, necessitating improvements in data center power management. The available space for the motherboard or accelerator card is usually limited, while the power consumption of CPU/GPU/ASIC chips is increasing continuously. To meet the stringent requirements of space and power, extremely compact and efficient power converters are demanded.

Specifically, a high-performance intermediate bus converter is needed to step down from a 48 V DC voltage to an intermediate bus voltage (usually ranging from 4 to 12 V) in data center power delivery.

Conventional cascaded converters rely on an intermediate DC bus voltage that reduces flexibility and the ability to achieve high step-down conversion efficiencies.

Accordingly, a need exists for a converter architecture which overcomes these conventional converter issues. The present disclosure fulfills that need and provides additional benefits over existing conversion systems.

BRIEF SUMMARY

This disclosure describes a cascaded converter architecture comprising a pure switched-capacitor (SC) stage and a resonant SC stage. Unlike conventional cascaded converters with an intermediate DC bus voltage, this converter uses multiple switching buses to connect the first-stage SC converter with second-stage multi-phase resonant SC converters. The flying capacitors of both stages are resonant with the output inductors, so the charge distribution loss is eliminated. Zero-current switching is realized by adjusting the duty ratio and switching frequency. By using the intermediate switching bus, the number of switches can be reduced, and the intermediate bus capacitor is not required; thereby greatly reducing component count and cost while improving power density.

Examples of applications in which the technology of this disclosure can be useful include, but are not limited to: (i) data center power delivery (from 48 Volts to 6-12 Volts) to support the fast increasing power demand of AI, IoT and so forth; (ii) all-electric and hybrid vehicles to bridge 48V distribution and legacy 12V legacy subsystems; (iii) portable electronics to enable more efficient and faster wired/wireless charging; and (iv) solar photovoltaics to improve the conversion efficiency between solar panels and the grid.

Further aspects of the technology described herein will be brought out in the following portions of the specification, wherein the detailed description is for the purpose of fully disclosing preferred embodiments of the technology without placing limitations thereon.

BRIEF DESCRIPTION OF THE DRAWINGS

The technology described herein will be more fully understood by reference to the following drawings which are for illustrative purposes only:

FIG. 37 through FIG. 39 are graphs of converter Ioff1$_{min}$ and Ioff2$_{min}$ under different operating conditions, according to at least one example embodiment of the present disclosure.

DETAILED DESCRIPTION

1. Introduction

Transformer-based converters, for example LLC (Inductor-Inductor-Capacitor) converters, or phase shifted full-bridge converters, are widely used in conventional intermediate bus applications. The switching frequency is usually pushed into the MHz range toward reducing transformer size, which complicates winding design since high-frequency eddy effect can significantly increase copper losses. In addition, transformer circuits have a fixed core loss over the entire load range, which limits light-load and peak efficiencies. As regulation and isolation are not required in the datacenter intermediate bus applications, the hybrid or resonant switched capacitor (SC) converters have emerged as potential improvements to conventional designs, and have gained increased attention in the research community. Since most of the energy in those converters is transferred through the capacitors, the inductors sustain very low, or even zero volt-seconds across them, which is beneficial for reducing magnetic loss and size. Moreover, the low volt-seconds inherent in these topologies enable very small magnetic elements, even at relatively low switching frequencies. In addition, high efficiency can be achieved since the capacitor charge redistribution loss is eliminated through soft charging, and switching loss is reduced through soft switching.

Among the existing resonant switched capacitor converters, the cascaded resonant converter shows outstanding efficiency and power density. This converter achieves a good balance of switch stress and passive component volume, and provides high levels of scalability due to the easily modularized 2-to-1 element. Two phases can be paralleled to offer higher current, and the second stages are interleaved to reduce intermediate capacitance. An updated version of the cascaded resonant converter was introduced which merges the first stage into one phase and achieves the highest power density (4068 W/in$^3$) and the highest efficiency (99.0%) of industry and academia. Although the total switch stress does not change, the merged first stage has considerable practical advantages in terms of reduction in PCB layout area, and number of level shifters and gate drivers.

2. Multiple Switching Bus Architecture

A cascaded converter architecture is described using a pure switched-capacitor (SC) stage and a resonant SC stage. This converter architecture uses multiple switching buses to connect the first-stage SC converter with the second-stage multi-phase resonant SC converters, and is thus unlike conventional cascaded converters with an intermediate DC bus voltage.

Figure 1:
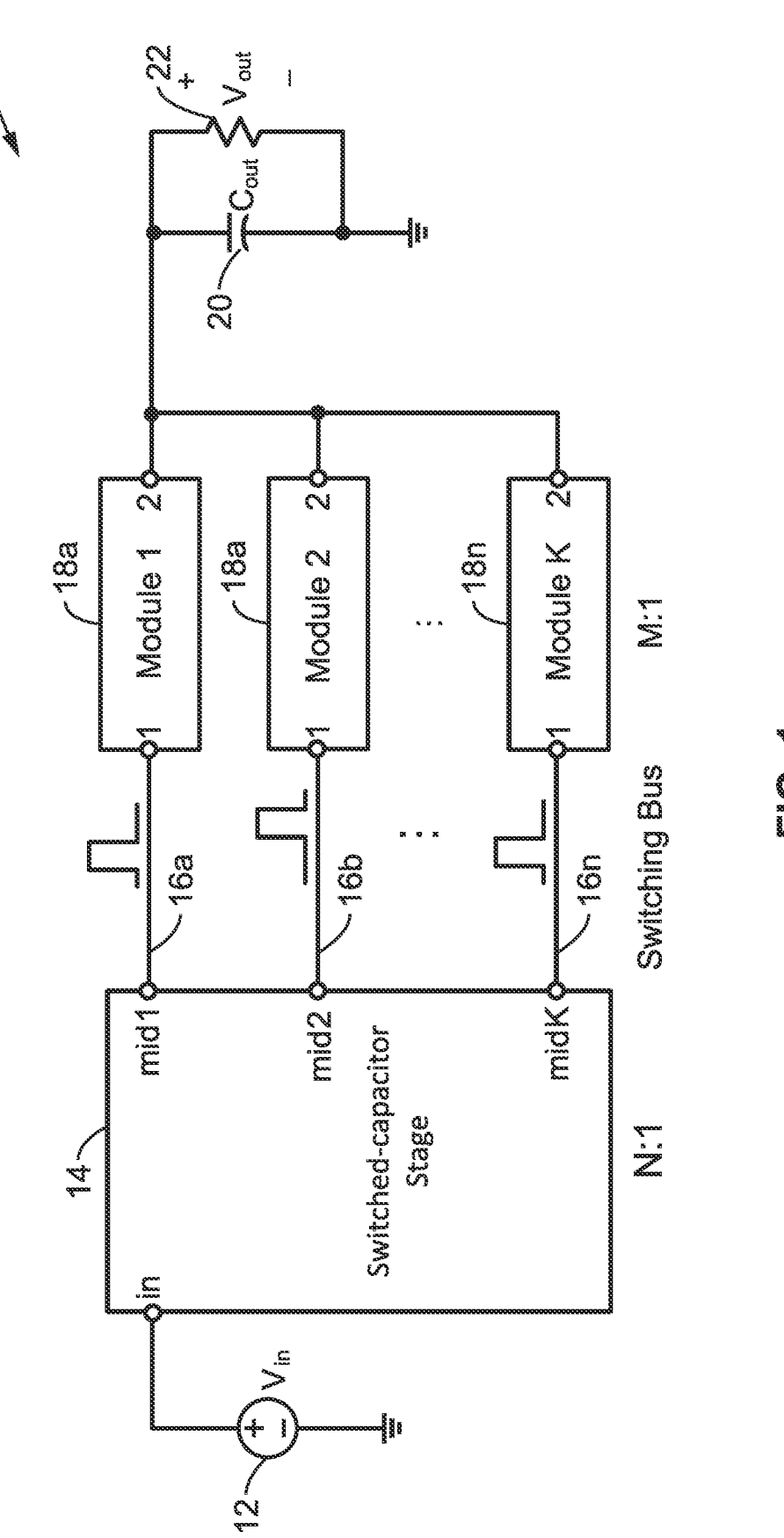
FIG. 1 is a block diagram of a resonant switched-capacitor converter with an intermediate switching bus, according to at least one example embodiment of the present disclosure.

FIG. 1 illustrates an example embodiment 10 of a cascaded converter architecture having multiple switching buses. The figure depicts power input 12 received by a first conversion stage comprising a pure switched-capacitor (SC) stage 14 having multiple outputs 16a, 16b through to 16n. Outputs from pure switched-capacitor (SC) stage 14 are connected by multiple switching buses to multiple sections 18a, 18b through to 18n of a second stage comprising multiple resonant switched-capacitor (SC) sections (elements or phases). Outputs from each of the multiple sections of the second-stage are coupled to a load, exemplified as capacitance 20 in parallel with resistance 22.

Unlike conventional cascaded converters with an intermediate DC bus voltage, the exemplary converter uses multiple switching buses to connect the first-stage SC converter with the second-stage multi-phase resonant SC converters.

Advantages of this architecture may include, but are not limited to, the following. (1) The architecture provides a flexible and high step-down conversion ratio. The first-stage N-to-1 conversion ratio and second-stage M-to-1 conversion ratio provides a total conversion ratio of N·M. (2) The architecture can provide high current capability. In particular, the multiple sections, hereafter referred to as phases, of the second stage can provide high combined output current. (3) In this architecture, the second-stage resonant SC module has one less switch than a conventional resonant SC converter with a DC input voltage for providing the same step-down conversion ratio. This feature can be helpful for reducing power losses including both switching loss and conduction loss, while also reducing layout effort, overall cost, and the complexity of gate-drive circuitry. (4) The architecture does not require an intermediate bus capacitor between the first stage and second stage, and this also can increase power density. (5) In this architecture, both the first-stage and second-stage flying capacitors are resonant with the output inductors of the second stage, so that charge distribution loss can be eliminated.

Figure 2:
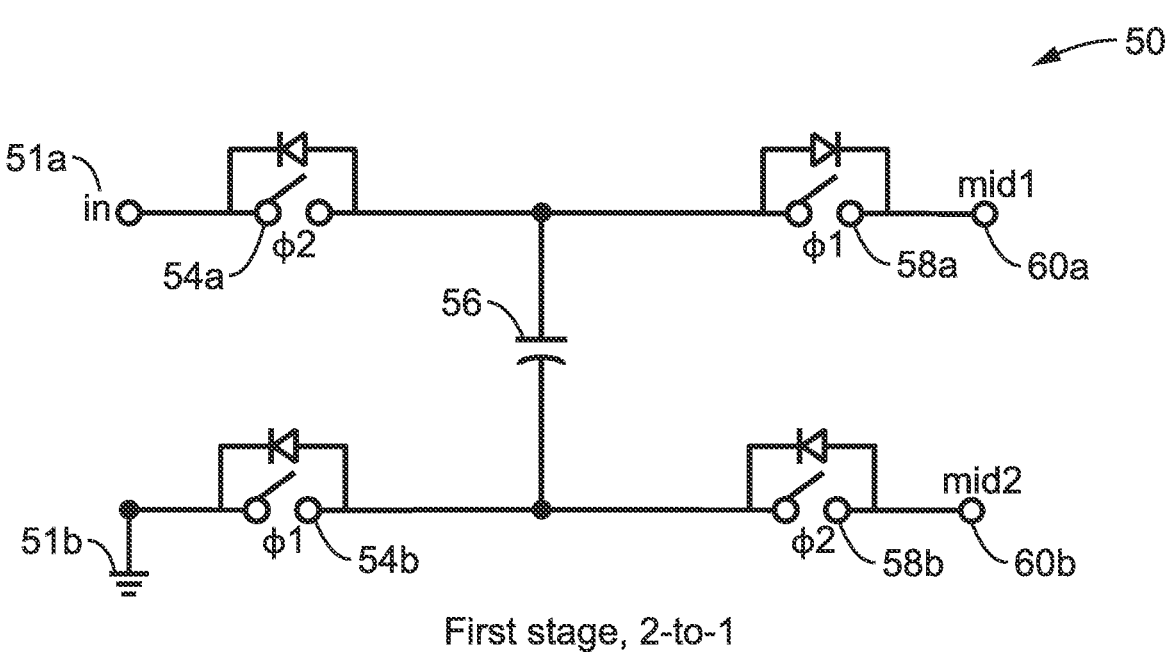
FIG. 2 through FIG. 4 are circuit diagrams of a 4-to-1 cascaded resonant converter having a first-stage 2-to-1 SC block with each output connected to a 2-to-1 resonant SC block, according to at least one example embodiment of the present disclosure.
Figure 3:
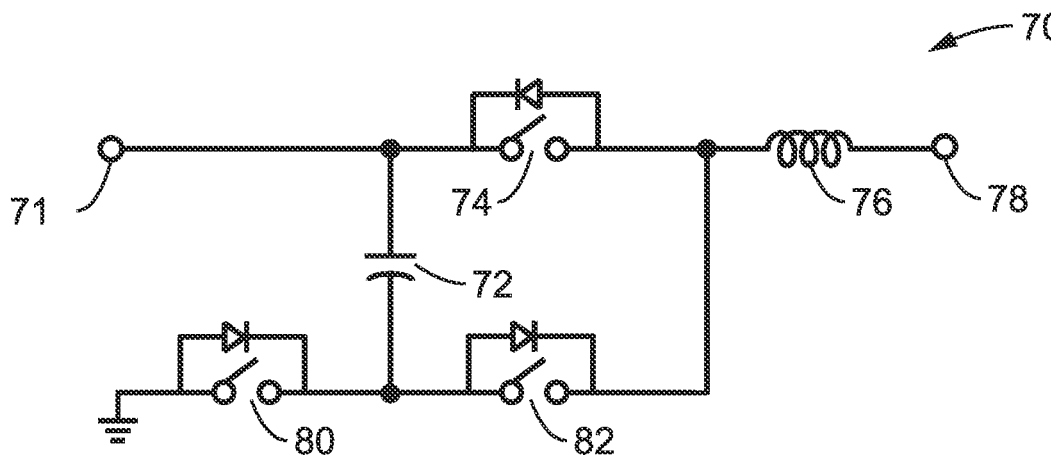
Figure 4:
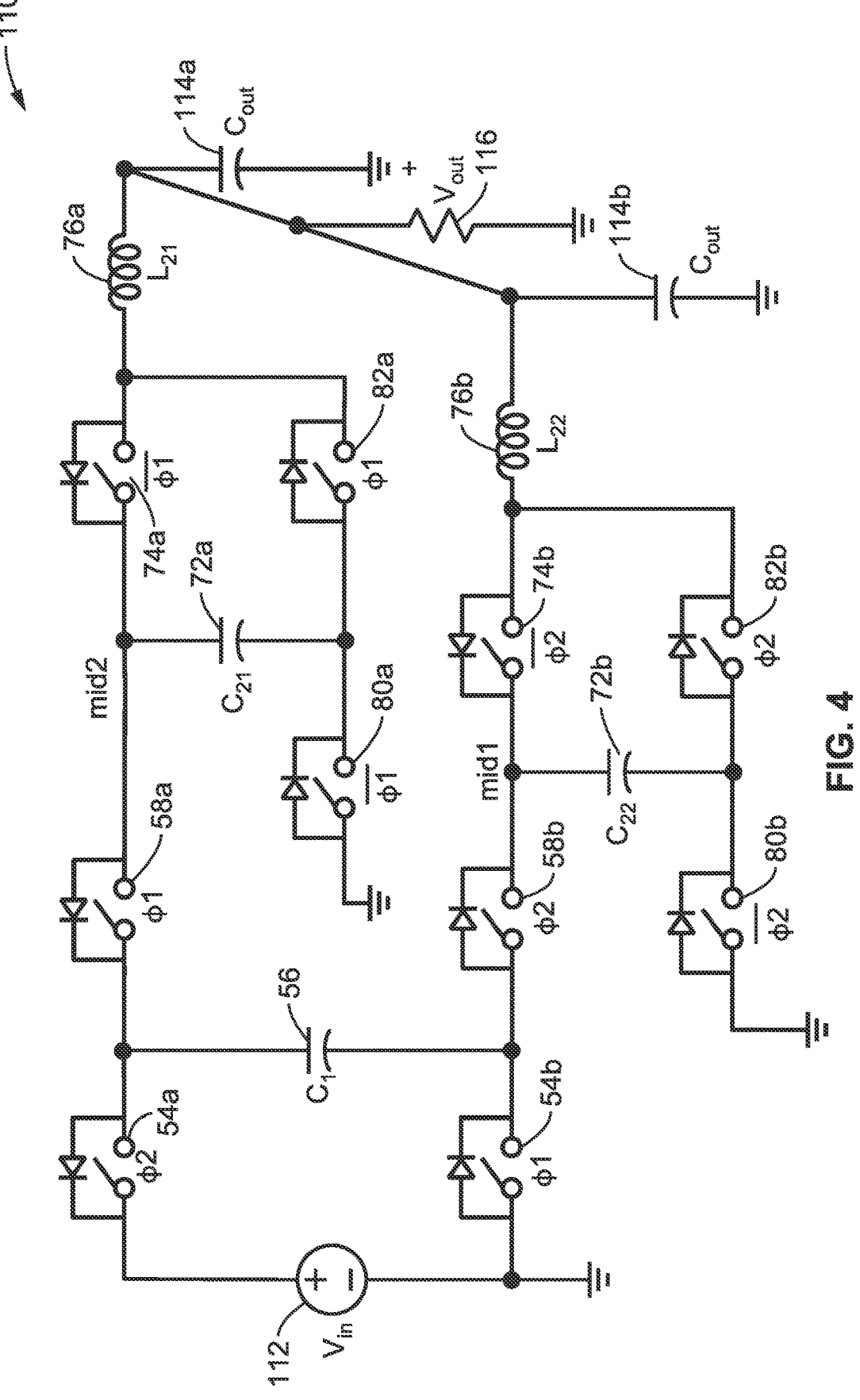

FIG. 2 through FIG. 4 illustrate an example embodiment 50, 70, 110 of a 4-to-1 cascaded resonant converter.

In FIG. 2 is seen 50 a first stage operating with a 2-to-1 step down conversion ratio. Power is connected to inputs 51a, 51b, leading respectively to parallel switches 54a, 54b connected to flying capacitor 56. On the output side of capacitor 56 are another pair of parallel switches 58a and 58b, whose outputs provide two output terminals, mid1 60a and mid2 60b.

In FIG. 3 is seen 70 a second stage in which each terminal is connected with a 2-to-1 module of FIG. 2. Compared with the conventional 2-to-1 resonant SC converter using four switches, the converter in the second stage has only three switches due to its switched input rather than a DC input. The first stage and second stage should be synchronized (synced) and operated with the same switching frequency and duty ratio.

A positive input 71 is shown connecting to capacitor 72, then on to switch 74 and in series with inductance (inductor 76) to output 78. The negative side of capacitor 72 is coupled between series switches; shown as a first switch 80 coupled to ground, and a second switch 82 coupling to the input of inductance 76.

In FIG. 4 is seen the overall 4-to-1 cascaded resonant converter 110 combining the architectural elements of FIG. 2 and FIG. 3 using multiple switching buses. Input 112 is directed to a single first stage as was seen in FIG. 2, here shown with the same numbering. There are then two phases of second stages, each being as the one depicted in FIG. 3, which are coupled to the first stage; such that the input of each second stage is coupled to different outputs from the first stage. The duality of the elements of the second stage is depicted in the numbering with capacitors 72a, 72b, switches 74a, 74b, series inductances 76a, 76b, to an output shown with $C_{out}$ capacitors 114a, 114b and load 116.

It should be appreciated that the load shown in these examples is depicted by way of example and not limitation, as the disclosed circuit can be utilized to drive a variety of loads, such as conventional loads as well as additional drive or conversion circuitry.

Figure 5:
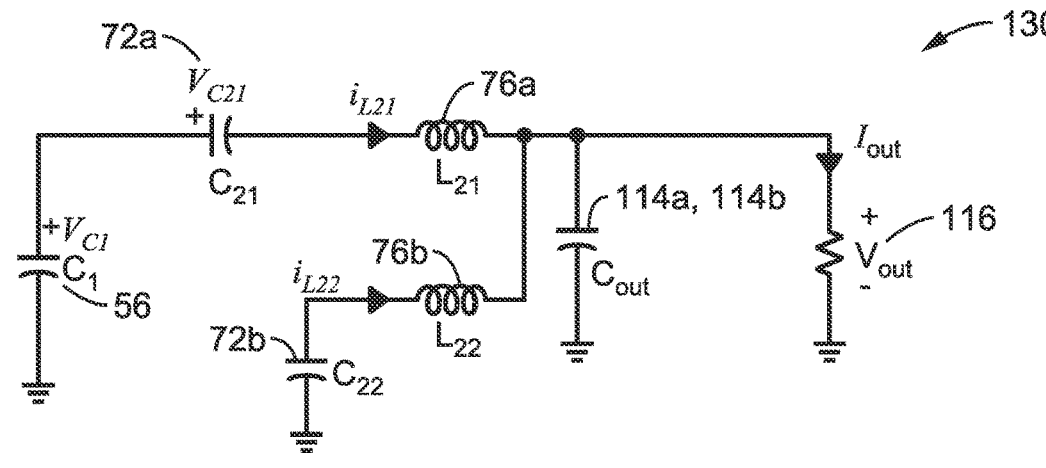
FIG. 5 through FIG. 7 are operating state diagrams for the three operating states of the converter shown in FIG. 4, according to at least one example embodiment of the present disclosure.
Figure 6:
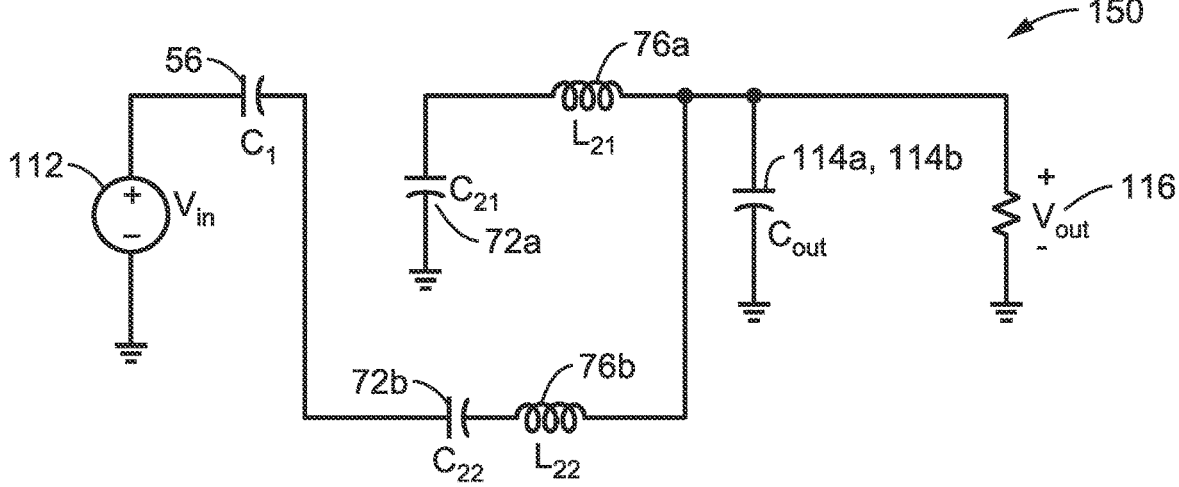
Figure 7:
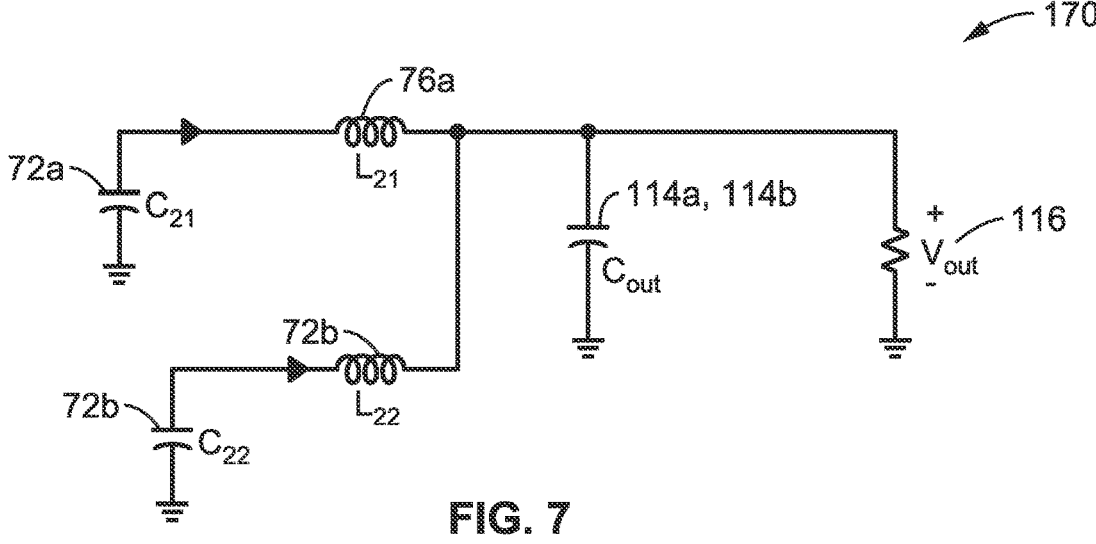

FIG. 5 through FIG. 7 illustrate example embodiments 130, 150, 170 of the three operating states for the converter of FIG. 4. This converter has three operation states with the equivalent circuits described below.

In FIG. 5 is shown state 1 which comprises $C_1C_{21}L_{21}$ and $C_{22}L_{22}$ resonant tanks.

In FIG. 6 is shown state 2 which comprises $C_1C_{22}L_{22}$ and $C_{21}L_{21}$ resonant tanks.

In FIG. 7 is shown state 3 which comprises $C_{21}L_{21}$ and $C_{22}L_{22}$ resonant tanks.

Since the two phases of the second stage are symmetrical, i.e., $L=L_{21}=L_{22}$ and $C_2=C_{21}=C_{22}$, the resonant tanks mentioned above can be classified into two categories: $LC_2$ tank with a resonant frequency of $$f_{r2} = \frac{1}{2\pi\sqrt{LC_2}},$$

and $LC_1C_2$ tank with a resonant frequency of $$f_{r12} = \frac{1}{2\pi\sqrt{LC_1C_2/(C_1+C_2)}}.$$

Comparing $f_{r2}$ and $f_{r12}$, the $LC_1C_2$ tank has a higher resonant frequency than $LC_2$ tank, and the duration time of $LC_1C_2$ resonance is shorter than that of $LC_2$ tank. In order to achieve perfect ZCS, the switching frequency fs, should equal $$f_r = 2/\left(\frac{1}{f_{r12}} + \frac{1}{f_{r2}}\right),$$

and the duty ratio D should equal $$\frac{f_r}{2f_{r12}}.$$

Figure 8:
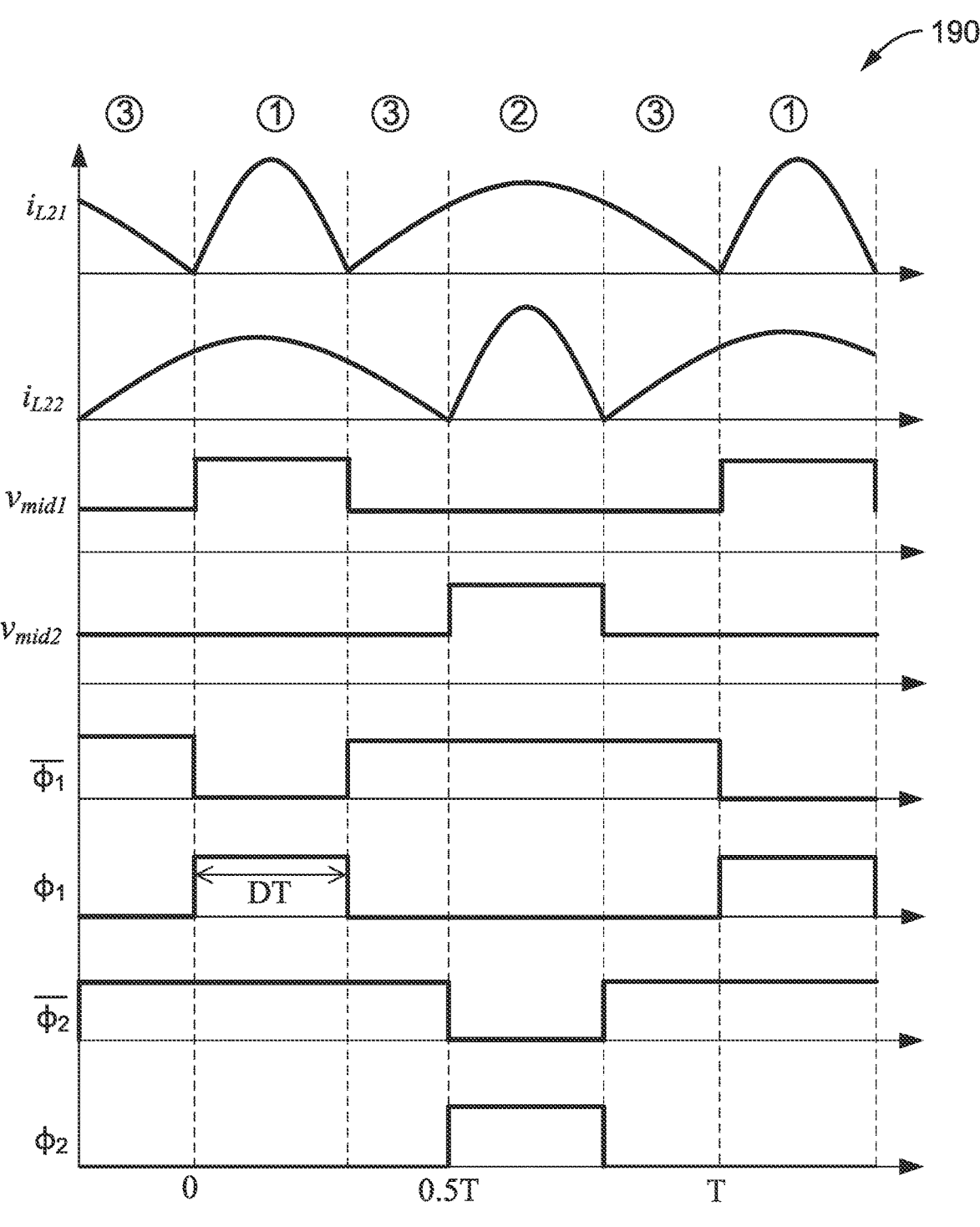
FIG. 8 is a waveform diagrams of Inductor currents, intermediate switching bus voltages, and PWM signals of a cascaded resonant converter under ZCS mode, according to at least one example embodiment of the present disclosure.

FIG. 8 illustrates an example embodiment 190 of typical inductor currents and PWM signals. Inductor current waveforms are shown $i_{L21}$ and $i_{L22}$, voltages $v_{mid1}$ and $v_{mid2}$ at the mid-line between first and second stages, a digital inverted phase 1, phase 1, inverted phase 2 and phase 2. The sequence of operation is seen at the top of the figure as state 3, state 1, state 3, state 2, which repeats. D is the duty ratio, and T is the switching period. "DT" is D times T.

The duty ratio D is related to the ratio of resonant frequencies at different operating phases. Zero-current switching is realized when the switching frequency matches the resonant frequency.

Figures 9, 10:
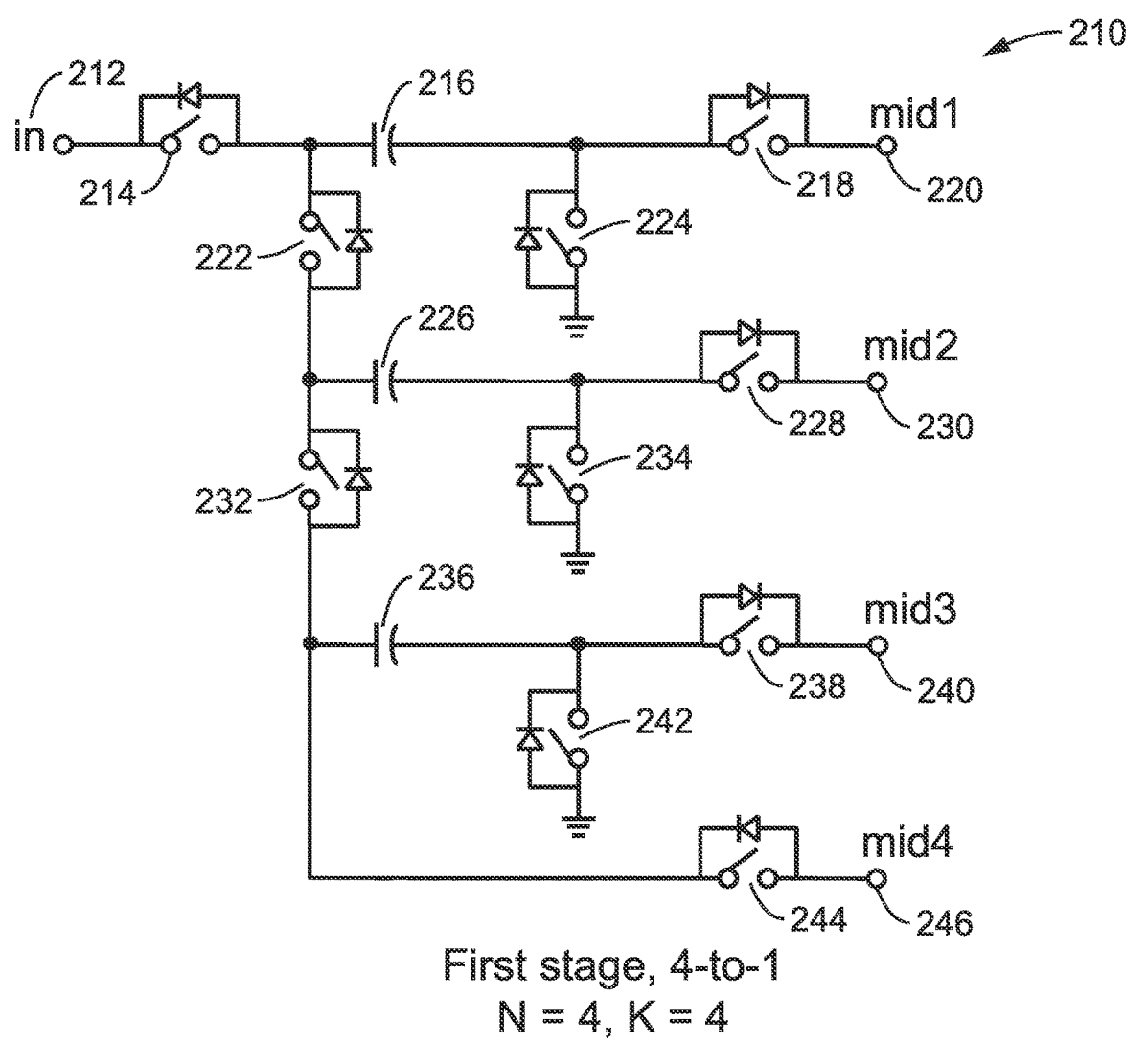
FIG. 9 through FIG. 11 are circuit diagrams of an 8-to-1 cascaded resonant converter architecture comprising a first stage 4-to-1 SC block with each output connected with a 2-to-1 resonant SC block, according to at least one example embodiment of the present disclosure.
Figure 11:
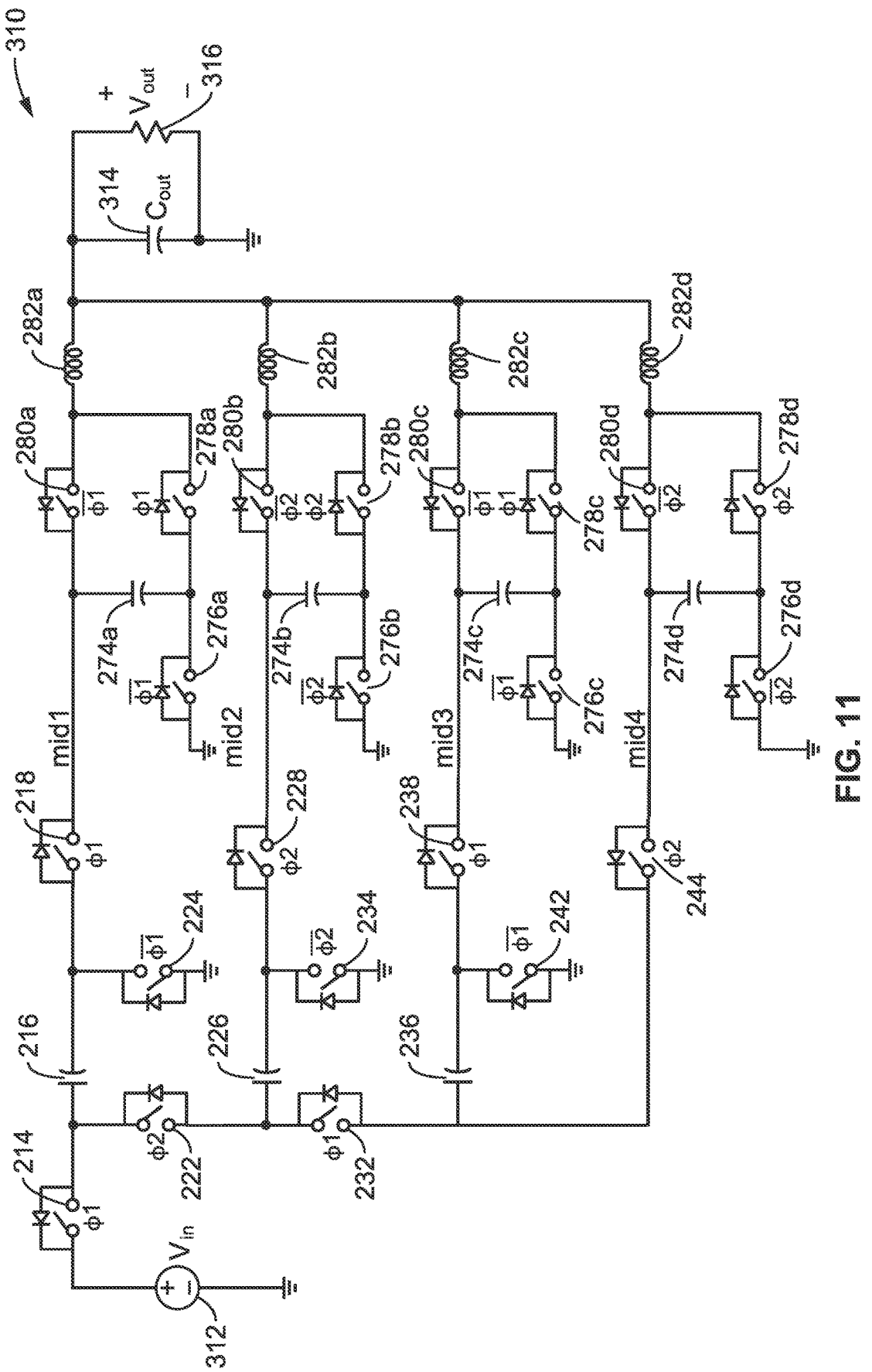

FIG. 9 through FIG. 11 illustrate another example embodiment 210, 270, 310 for an 8-to-1 cascaded resonant converter architecture (FIG. 11) comprising a first stage (FIG. 8) and a second stage (FIG. 10).

In FIG. 9 is shown a first stage 4-to-1 (Step down ratio=N=4, Output count=K=4) SC block 210 with input 212 and dividing off into four output terminals 220, 230, 240 and 246. Each of these output terminals is connected with an associated 2-to 1 resonant SC converter, i.e., four phases are paralleled in the second stage to handle high output current. A cascade of series switches 214, 222, and 232 bring the power to the four phases on a first side of flying capacitors 216, 226 and 236, with the fourth stage without a flying capacitor. Three of these phases having a switch to ground 224, 234, 242. The output side of the three flying capacitors, and input line through phase four, are connected to switches 218, 228, 238 and 244 to the outputs mid1 220, mid2 230, mid3 240 and mid4 246.

In FIG. 10 is shown a second stage 2-to-1 (M=2) 270 having only two phases, which in at least one embodiment is preferred for lower current applications compared to the use of a 4-phase case. Stage input 272 is shown connecting to a first side of flying capacitor 274, with a second side on the input side connected to switch 276 to ground. Switches 278 and 280 are connected respectively to each end of flying capacitor 274, with outputs connecting together into inductor 282 to output 284.

In FIG. 11 is seen the overall 8-to-1 cascaded resonant converter architecture combining the element of FIG. 9 and FIG. 10. Voltage input 312 is shown coupled to the first stage as was shown in FIG. 9. Then four phases of the circuit shown in FIG. 10 are depicted with similar numbering, showing flying capacitors 274a, 274b, 274c and 274d. Mid switches to ground are 276a, 276b, 276c, and 276d. The parallel output switches on each of these phases have switches 280a, 280b, 280c, and 280d; which are in parallel with switches 278a, 278b, 278c, and 278d. Inductors 282a, 282b, 282c and 282d, are seen on the output connecting to a load exemplified with capacitance 314 and resistance 316.

Figure 12:
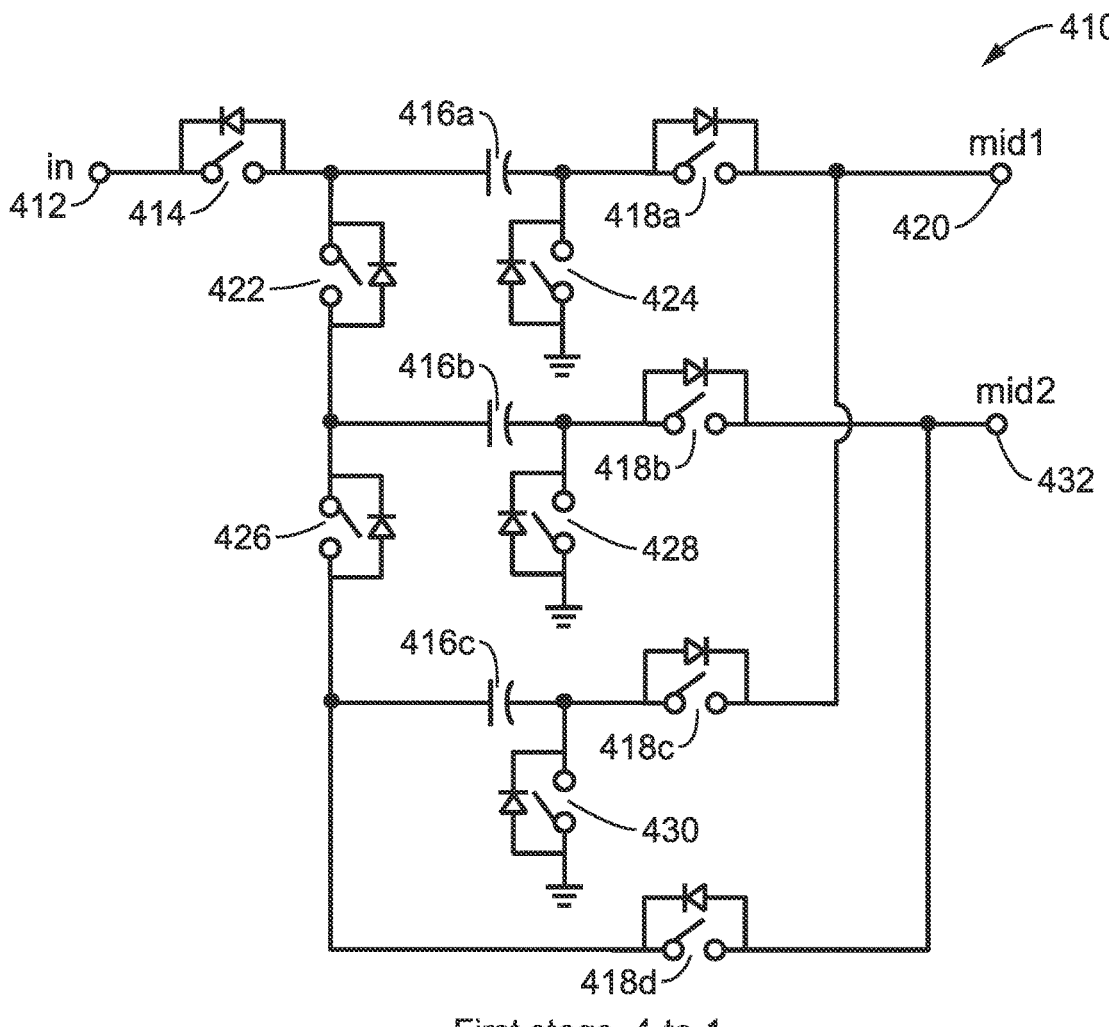
FIG. 12 through FIG. 13 are circuit diagrams of an alternate 8-to-1 cascaded resonant converter architecture in which the step-down ratio (N) of the first stage is not required to be the same as its output counts (K), according to at least one example embodiment of the present disclosure.
Figure 13:
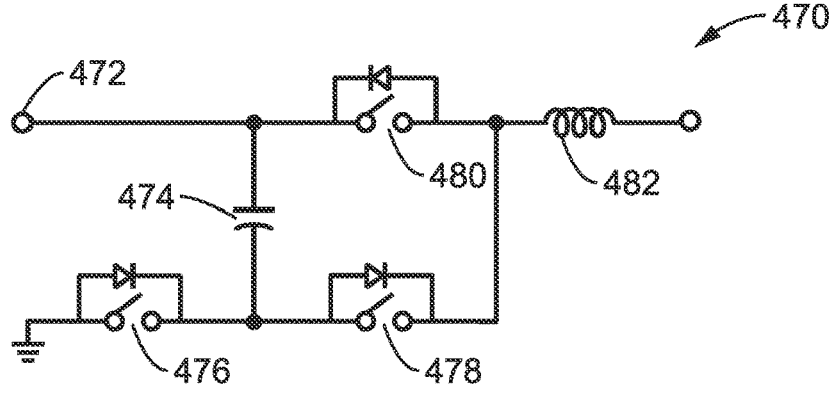
Figure 14:
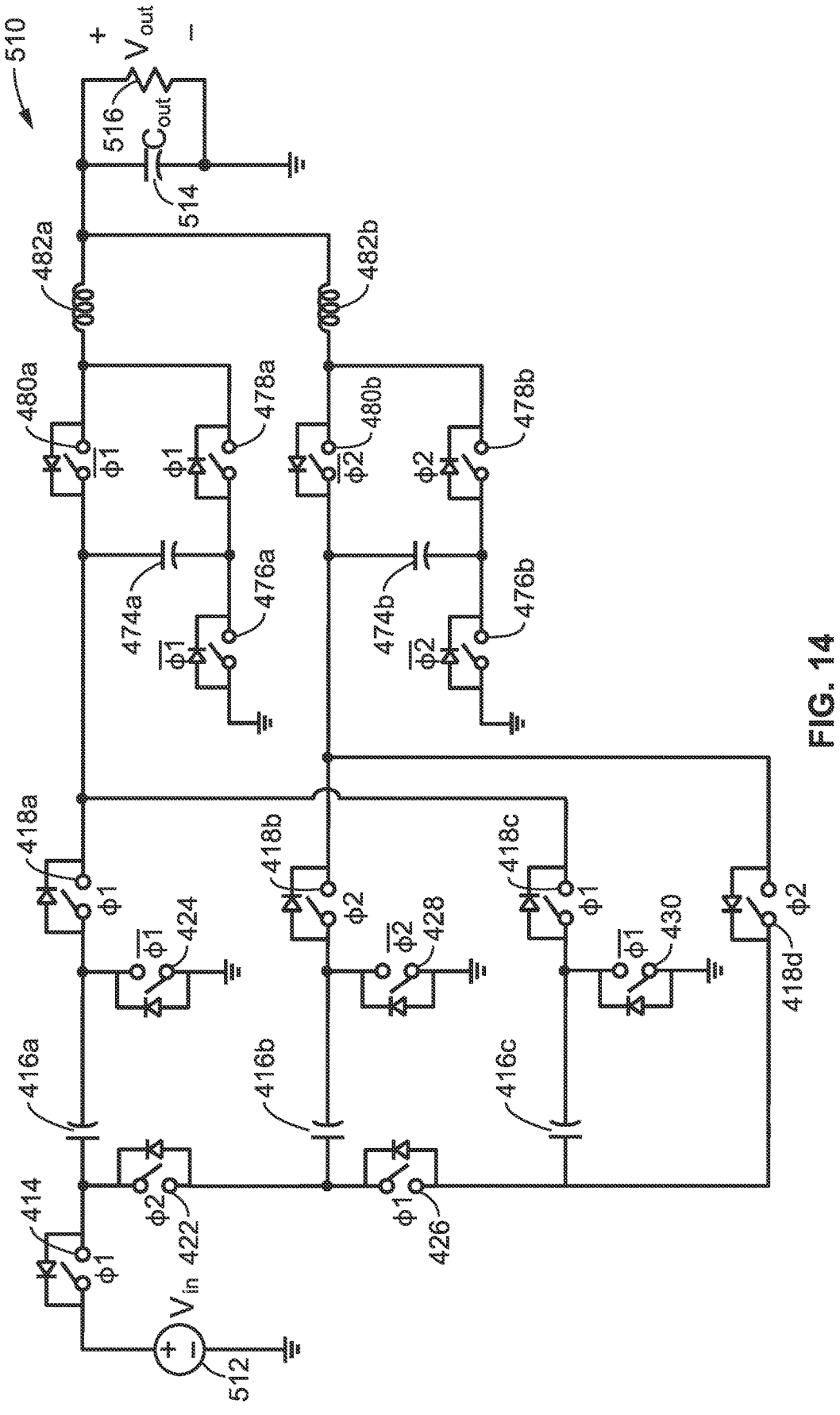

FIG. 12 through FIG. 14 illustrate an example embodiment 410, 470, and 510 of an alternate 8-to-1 cascaded resonant converter architecture in which the step-down ratio (N) of the first stage is not required to be the same as its output counts (K).

In FIG. 12 is an alternate first stage (N=4, K=2) 410 having only 2 outputs as compared to the example in FIG. 9 having four outputs. Input 412 is shown which supplies power to each of the four sections, through switches 414, 422 and 426. Flying capacitors 416a, 416b and 416c are seen on the top three sections. Grounding switches 424, 428 and 430 are seen after each of the uppermost flying capacitors. Each section then has an output switch 418a, 418b, 418c and 418d; with outputs from switches 418a and 418c coupled together as mid1 output 420, while outputs from switches 418b and 418d are coupled together as mid2 output 432. In this example, alternate segments (phases) are connected to the outputs.

In FIG. 13 is shown the second stage (M=2) 470, which can be similar to that shown in FIG. 10, although only two of these elements would be required in view of the fewer outputs from the first stage. Stage input 472 is shown connecting to a first side of flying capacitor 474, with a second side on the input side connected to switch 476 to ground. Switches 478 and 480 are connected respectively to each end of flying capacitor 474, with outputs connecting together into inductor 482 to output 484.

In FIG. 14 is seen the resultant alternate 8-to-1 cascaded resonant converter having N=4 and K=2. Input 512 is directed into the 4-to-1 stage shown in FIG. 12. The second stage has two phases of the circuit shown in FIG. 10, the upper one showing elements 474a, 476a, 478a, 480a, and 482a; while the lower one depicts elements 474b, 476b, 478b, 480b, and 482b. Outputs from these two phases of stage 2 through inductors 482a, 482b are coupled together and connected to an output shown with capacitance 514 and resistance 516.

Figure 15:
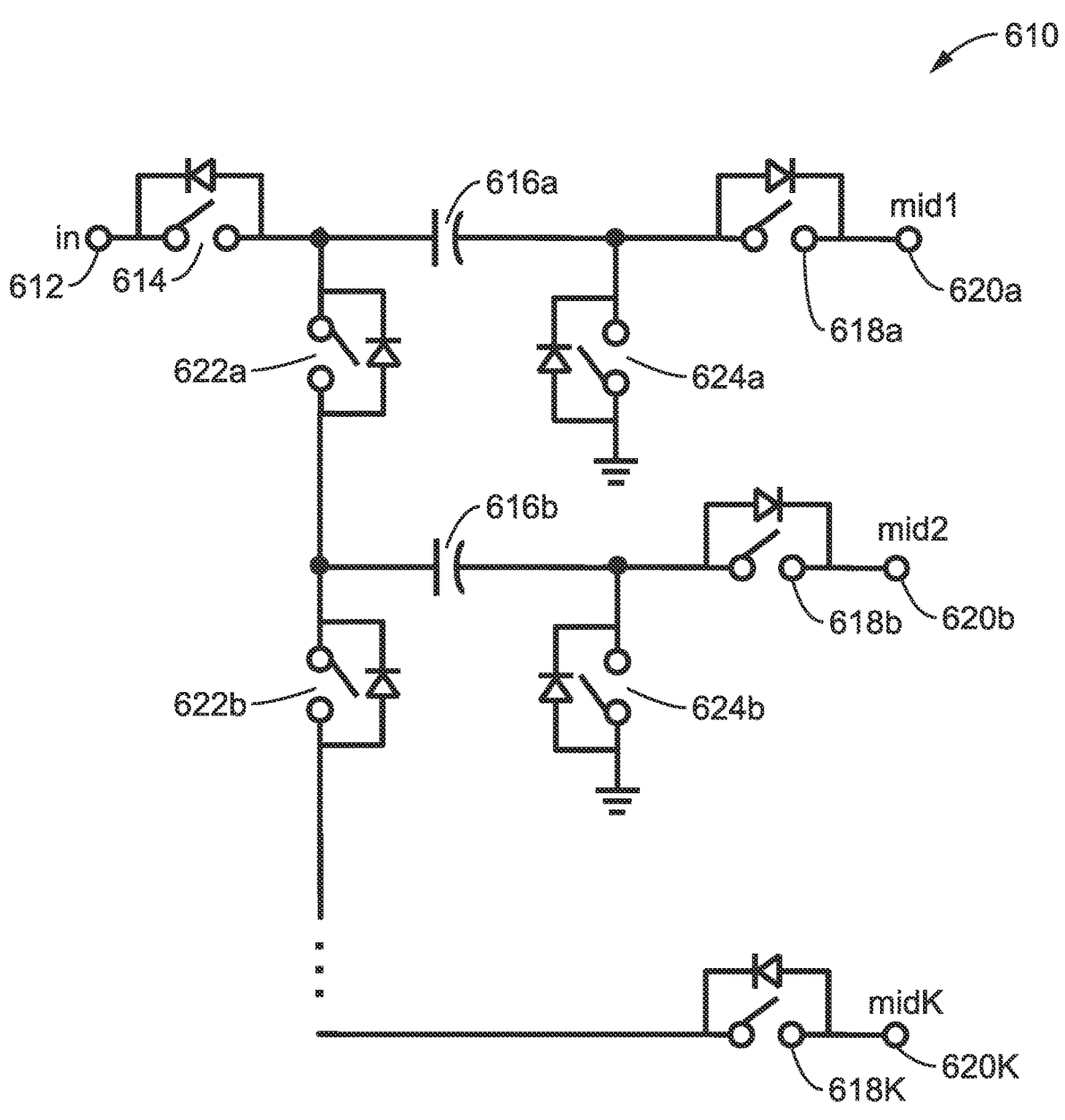
FIG. 15 is a circuit diagram of a first-stage with an N step down ratio and K outputs, according to at least one example embodiment of the present disclosure.

FIG. 15 illustrates an example embodiment 610 of a first-stage with an N step down ratio and K outputs. This circuit depicts a generalization of the circuit shown in FIG. 9. Power 612 is input through switches 614, 622a, 622b and so forth for each of the outputs down to the midK output 620k. Flying capacitors 616a, 616b, are utilized for phases preceding the midK output. Grounding switches 624a, 624b are utilized for phases preceding the midK output, and are coupled after the flying capacitor on each of the upper output lines, excluding the midK output line. Series switches 618a, 618b through to 618k are seen preceding each of the outputs mid1 620a, mid2 620b, through to midK 620K.

Figure 16:
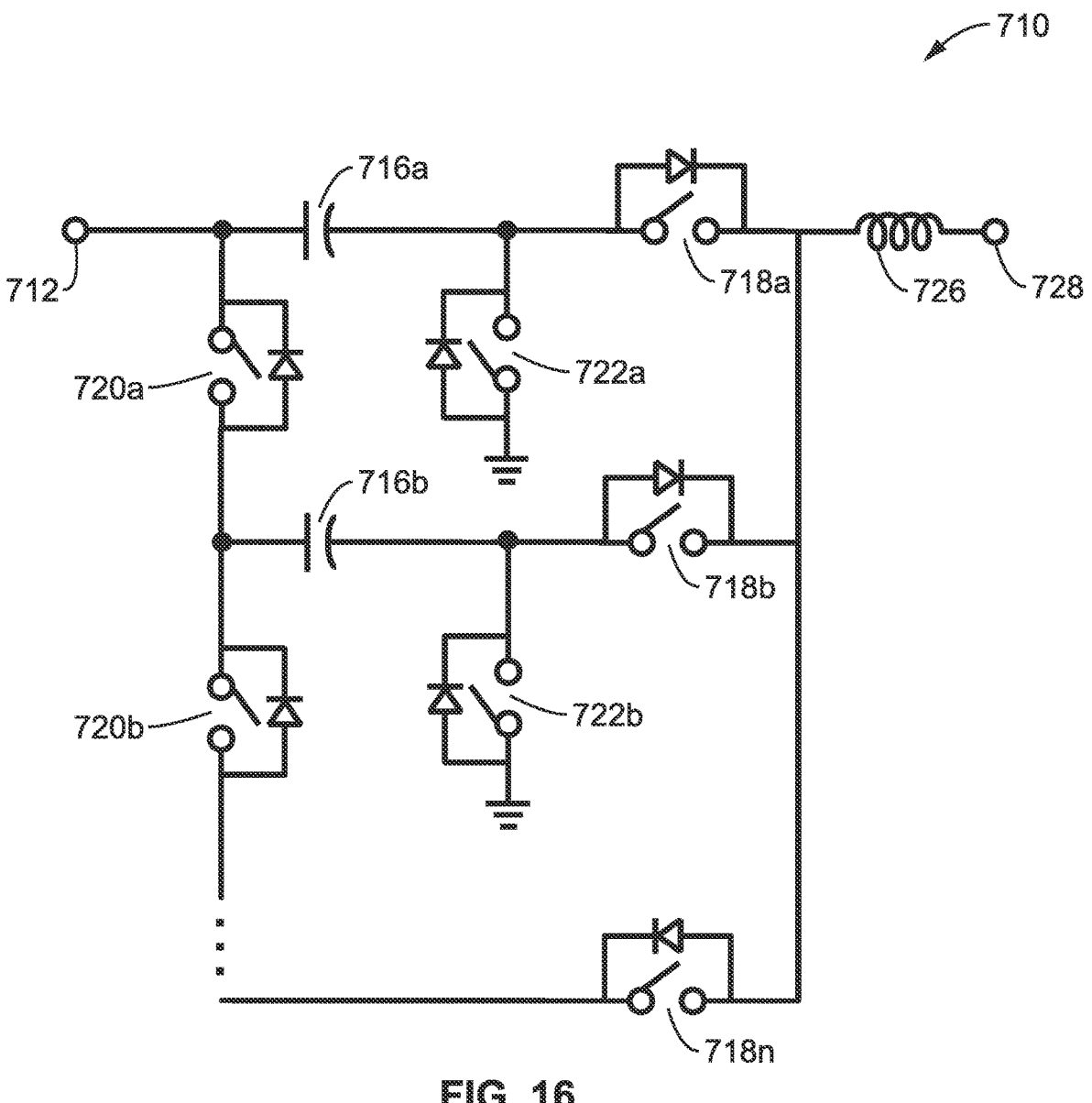
FIG. 16 is a circuit diagram of a second-stage with M step down ratio, according to at least one example embodiment of the present disclosure.

FIG. 16 illustrates an example embodiment 710 of a second-stage module with an M step down ratio, provided by M sub-phase circuits. This circuit is a generalization of that shown in FIG. 9 and FIG. 12. Input 712 is shown which supplies power to each of the M sections, such as through switch 720a, 720b and down through to all but the last phase. Flying capacitors 716a, 716b are utilized through all but the last section. Grounding switches 722a, 722b are also connected to all but the last section. Each section (sub-phase circuit) then has an output switch 718a, 718b, on through to the last section. The outputs can be connected in various ways. In FIG. 9, each mid output was connected to an element of FIG. 16. In FIG. 12 the odd numbered elements were connected to a mid1 output, while the even numbered elements were connected to a mid2 output. The diagram here depicts each section output connecting to a single output through inductor 726 to an output 728.

Figure 17:
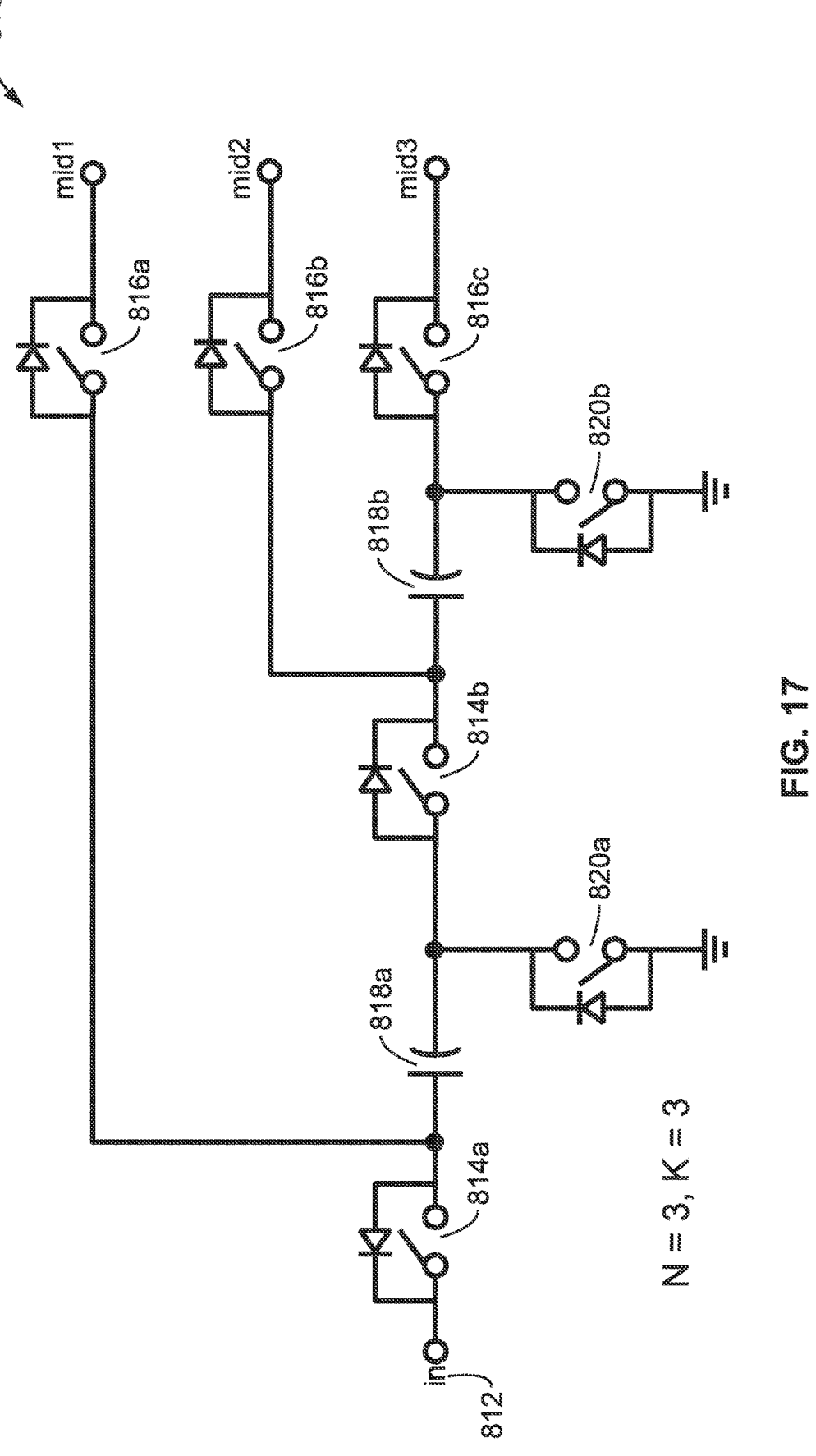
FIG. 17 is a circuit diagram of a first-stage using a series-parallel topology, according to at least one example embodiment of the present disclosure.

FIG. 17 illustrates an example embodiment 810 of a first-stage using a series-parallel topology. Power 812 is input through switch 814a to capacitor 818a (flying capacitor), connecting to switch 814b, to capacitor 818b, to switch 816c to mid3 output. There are shown grounding switches 820a, 820b coupled to the output sides of capacitors 818a, 818b. Other outputs are shown connected at intermediaries at the inputs of capacitor 818a through to switch 816a to mid1 output, and at the input of capacitor 818b through to switch 816b to mid2 output.

Figure 18:
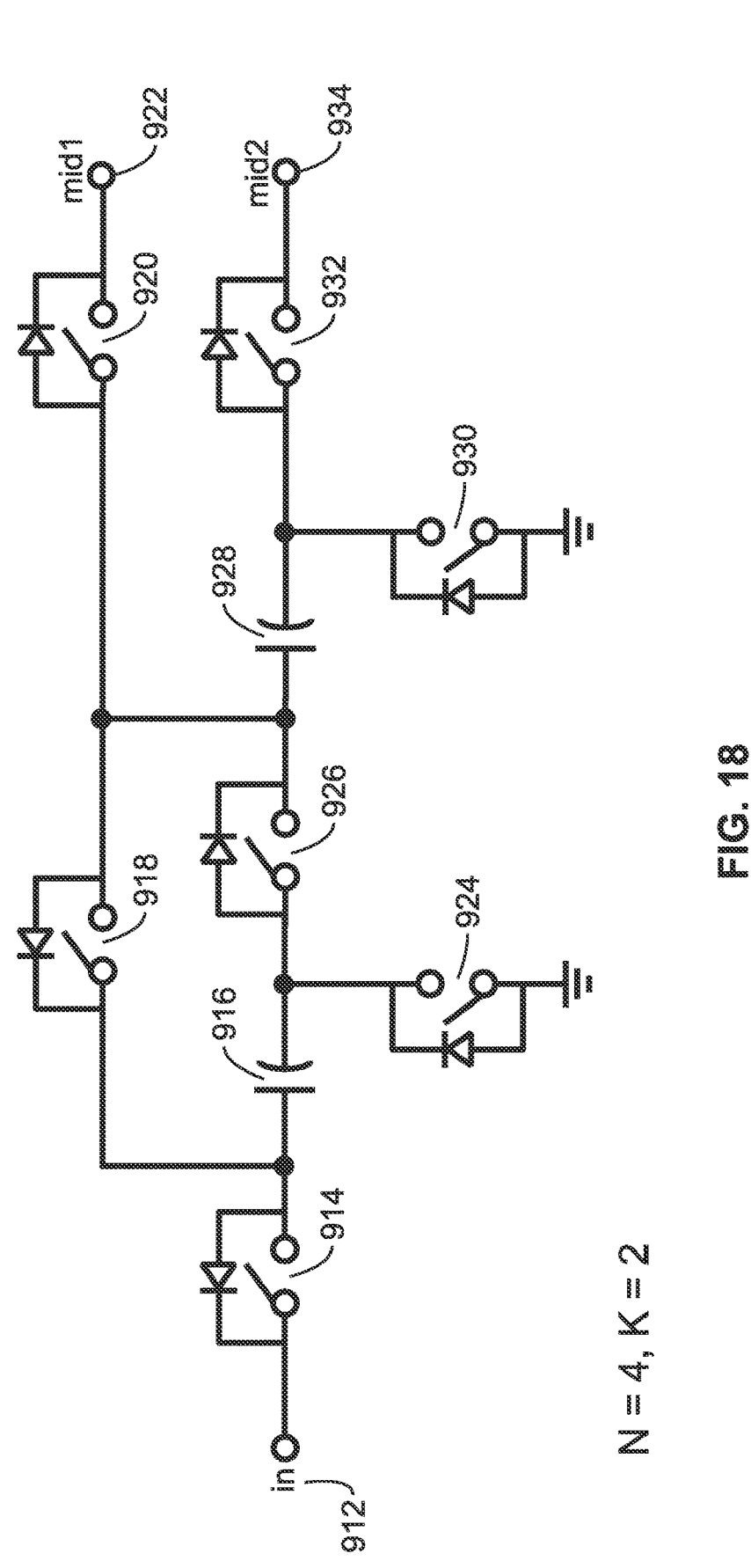
FIG. 18 is a circuit diagram of a first-stage using a Fibonacci topology, according to at least one example embodiment of the present disclosure.

FIG. 18 illustrates an example embodiment 910 of a first-stage using a Fibonacci topology. Power 912 is input through switch 914a to capacitor 916 (flying capacitor), connecting to switch 926 to capacitor 928, then connecting through switch 932 to the mid2 output. There are showing grounding switches 924, 930 coupled to the output sides of capacitors 916 and 928. There are then switches 918 and 920, connecting in at the inputs of capacitors 916 and 928, providing a mid1 output.

3. Verification

To verify the operation of the 4-to-1 converter in FIG. 4, a hardware prototype was built and tested with an input voltage ranging from 40 to 60 V and an output current of up to 80 A. The resulting prototype provided a 6000 Watt/in$^3$ power density, a 99.0% peak efficiency, and a 97.7% full-load efficiency at the nominal voltage 48 V. These results reflect a dramatic improvement over state-of-the-art converters from both industry and academia.

4. Zero Voltage Switching Operations

4.1. Zero-Voltage-Switching (ZVS) Mode

Figure 19:
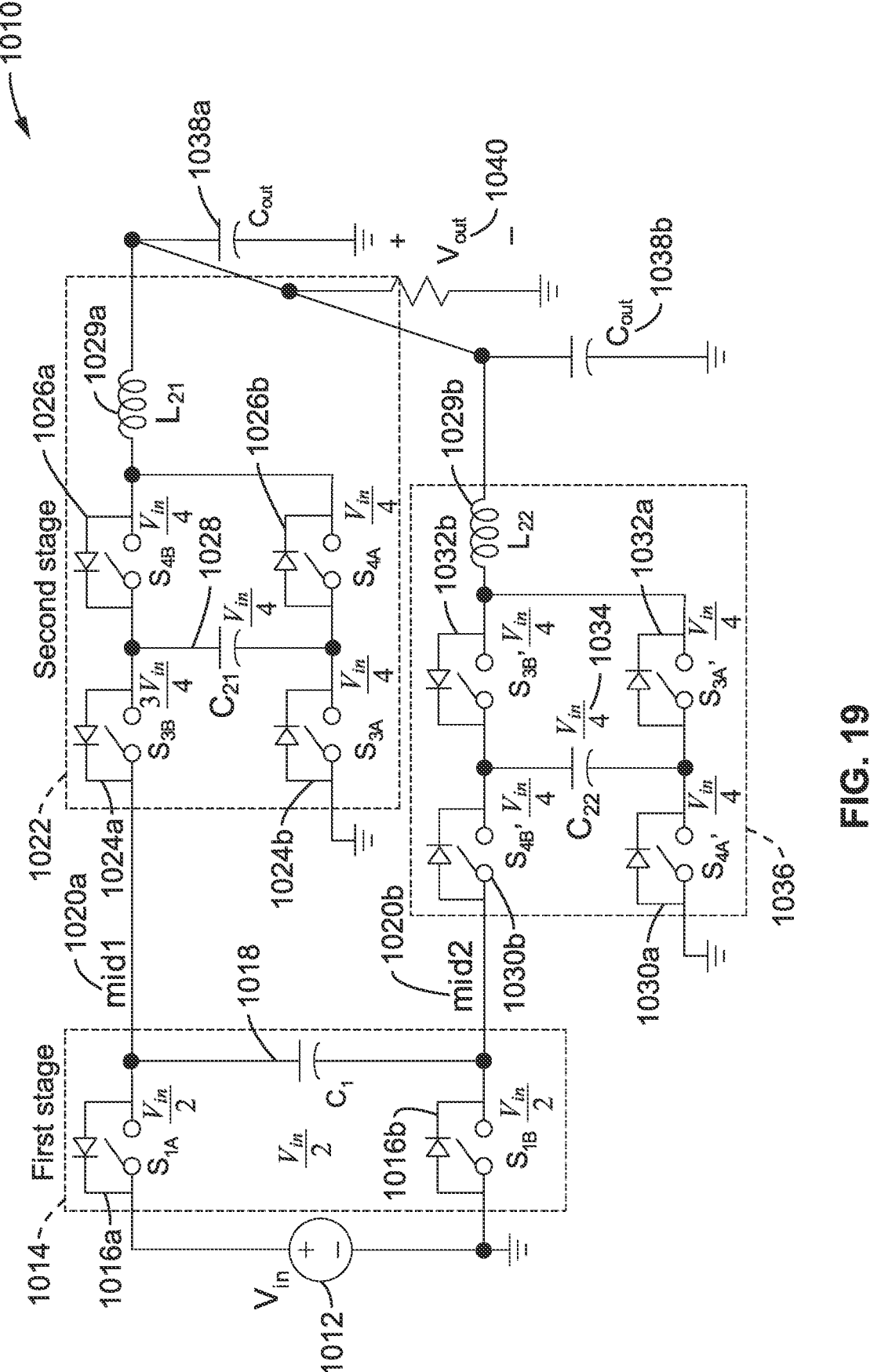
FIG. 19 is a schematic of a cascaded multi-resonant converter topology according to at least one example embodiment of the present disclosure.

FIG. 19 illustrates a 10-switch cascaded multi-resonant converter 1010. The 4-to-1 cascaded resonant converter 1010 has the same structure as that of FIG. 4, but is driven in a Zero-Voltage-Switching (ZVS) mode. Input 1012 is directed to a single first stage 1014 having switches 1016a, 1016b coupled between input 1012 and capacitor C1 1018. The first stage is followed by two phases 1022, 1036 of a second stage; such that the input of each second stage phase is coupled to different outputs from the first stage. In phase 1022, is shown with input switches 1024a, 1024b, with outputs connected to capacitor C21 1028. On the output side are two more switches 1026a, 1026b whose outputs are connected through inductor 1029a to output capacitor 1038a at output load 1040. The second phase portion of the second stage is the same as the first, with input switches 1030a, 1030b, capacitor $C_{22}$ 1034, and output switches 1032a, 1032b coupled through inductor $L_{22}$ 1029b to output capacitor 1038b. The voltage ratings for the switches and flying-capacitors are labeled in FIG. 19. The converter in FIG. 19 can operate in a ZVS mode by modifying the PWM scheme in FIG. 8 and adding an interval $T_{ZVS}$, where the inductor current is decreasing linearly.

Figure 20:
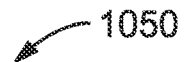
FIG. 20 is a plot of current waveforms and PWM driving signals for the converter of FIG. 19, according to at least one example embodiment of the present disclosure.
Figure 20:
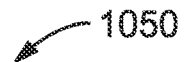

FIG. 20 illustrates current waveforms and PWM driving signals 1050 of the proposed converter operating at ZVS mode. The detailed gate drive signals and corresponding resonant currents are shown in the figure. In the following analysis, the parasitic parameters such as Coss, ESR, and ESL are not considered. The output voltage is considered as a constant voltage source since $C_{out}$ is sufficiently large.

Specifically, the figure depicts currents $I_{L21}$ and $I_{L22}$ through inductors $L_{21}$ and $L_{22}$. Similarly, capacitor currents $I_{C1}$ and $I_{C2}$, are shown. Control signals are shown for switches S4B, S4A, S3B, S1A, S3B', S4A', S4B', S3A', and S1B. These signals are shown in relation to time periods, such as including to through $t_8$ in a cycle having states 1, 3, 2, and 3 as seen at the top of the figure. Delay times $T_d$ are also shown in the figure in relation to $t_0$ through $t_8$, as well as a pulse width DT. The waveforms are marked also with $T_{ZVS}$, $I_{off1}$, $I_{off2}$, $I_{pk1}$, and $I_{pk2}$.

FIG. 21 through FIG. 26 illustrates equivalent circuits 1070, 1090, 1110, 1130, 1150, and 1170 of ZVS turn-on of S3B, S4B, S3A, and S4A for the timing signals shown in FIG. 20 during $t_0$ to $t_3$.

Figure 21:
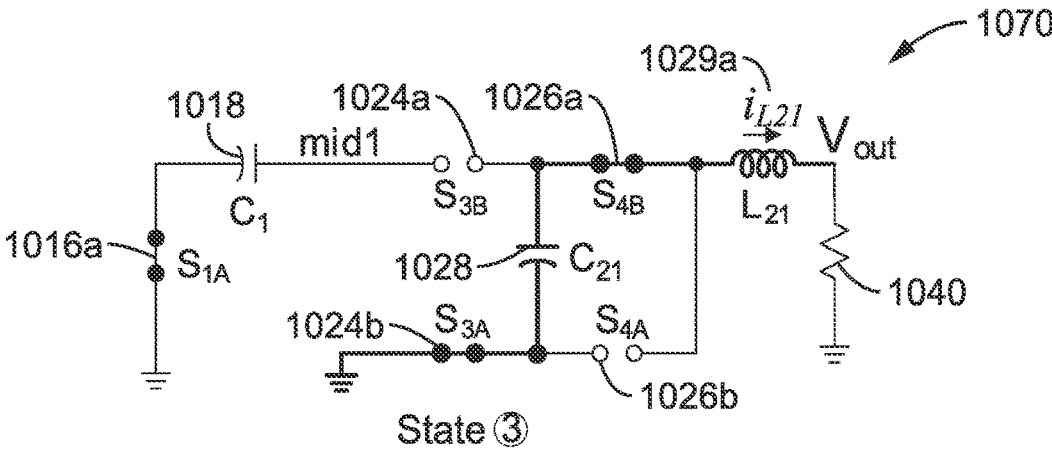
FIG. 21 through FIG. 26 are equivalent circuits of ZVS turn-on of S3B, S4B, S3A, and S4A for the timing signals shown in FIG. 20, according to at least one example embodiment of the present disclosure.
Figure 22:
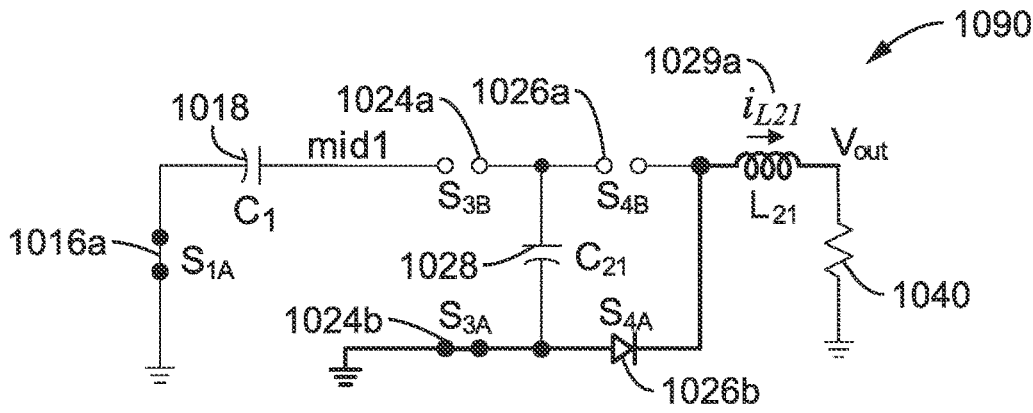
Figure 23:
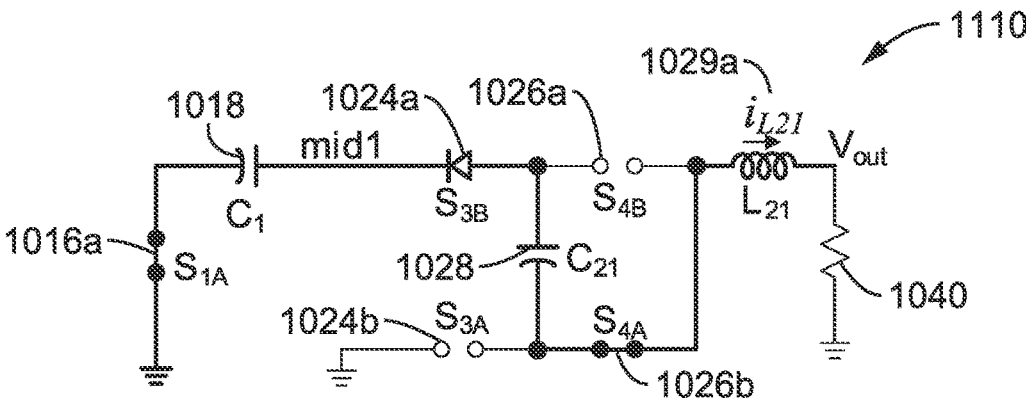
Figure 24:
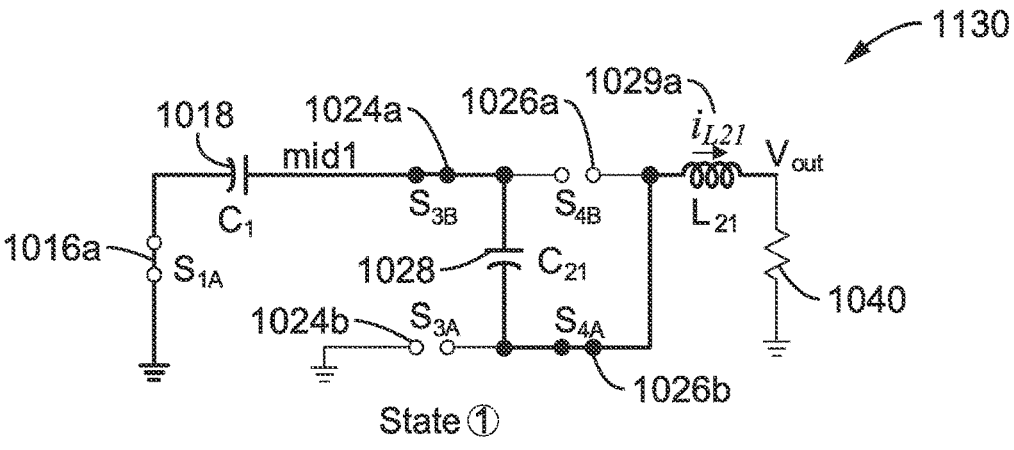
Figure 25:
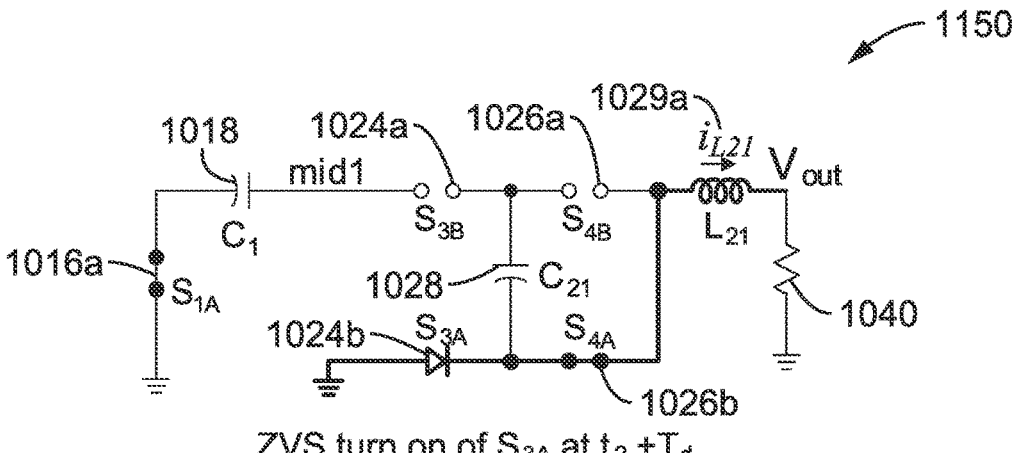
Figure 26:
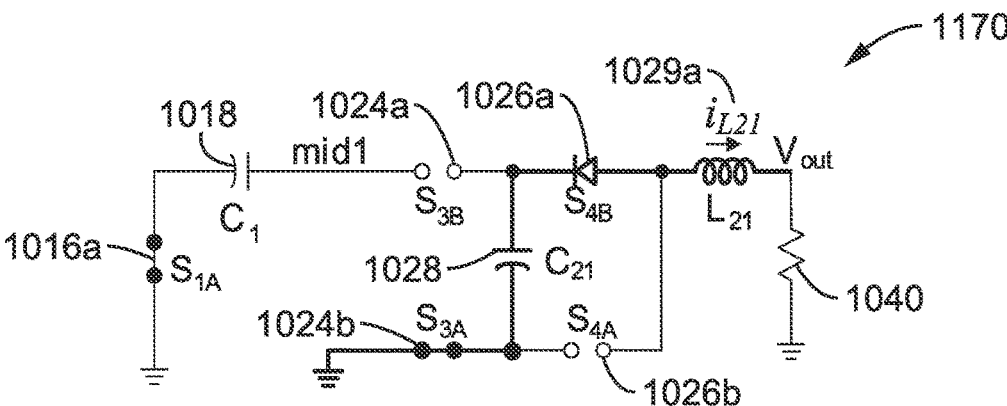

In FIG. 21, before to, the second-stage capacitor $C_{21}$ resonates with $L_{21}$. As the switching frequency is higher than the resonance frequency, the inductor current $i_{L21}$ is positive at to. In FIG. 22, after the high-side switch S4B is turned off at to, then the positive current $i_{L21}$ forces the body diode of S4A to turn on and the S4A channel is zero-voltage turned on within a short dead time $T_d$. The left terminal of inductor $L_{21}$ is then tied to ground from $t_0$ to $t_1$, and causes $i_{L21}$ to decrease linearly. When $i_{L21}$ drops to a certain negative current at $t_1$, the low-side switch S3A is turned off, and the negative current $i_{L21}$ forces the body diode of S3B to turn on, as shown in FIG. 23. In FIG. 24, switch S3B is turned on with zero voltage across it, upon which capacitors $C_1$ and $C_{21}$ start to resonate with $L_{21}$ from $t_1$ to $t_2$ in state 1. In FIG. 25, the high-side switch S3B is turned off at $t_2$, and the positive current $i_{L21}$ forces the body diode of S3A to turn on, indicating ZVS of S3A. Since the low-side switches S3A and S4A are both on from $t_2$ to $t_3$, the inductor current $i_{L21}$ linearly decreases. In FIG. 26, the switch S4A is turned off at $t_3$, and the negative current $i_{L21}$ forces the body diode of S4B to turn on, indicating ZVS of S4B. Overall, the switches S3B, S4B, S3A, and S4A can achieve zero-voltage turn on.

FIG. 27 through FIG. 32 illustrates example equivalent circuits 1190, 1210, 1230, 1250, 1270 and 1290 depicting ZVS turn-on of S1B, S3B', S3A', and S4A' as well as Zero Current Switching (ZCS) turn-on and turn-off of S1A and S4B'. The timing for this is shown in FIG. 20. Following the steps above, the soft-switching operation can be analyzed for the other six switches during the interval $t_4$-$t_7$, with the following describing the corresponding equivalent circuits.

Figure 27:
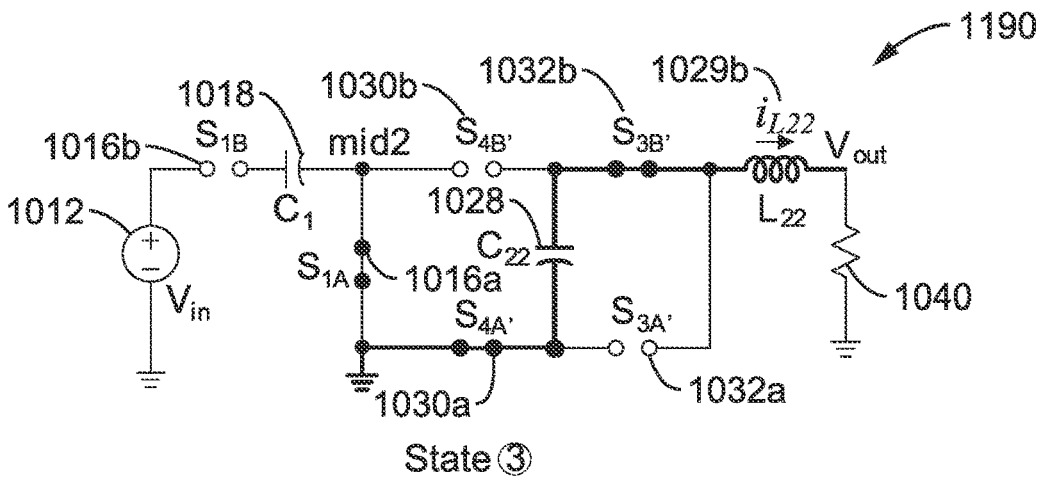
FIG. 27 through FIG. 32 are equivalent circuits depicting ZVS turn-on of S1B, S3B', S3A', and S4A' as well as Zero Current Switching (ZCS) turn-on and turn-off of S1A and S4B, for the timing signals shown in FIG. 20, according to at least one example embodiment of the present disclosure.
Figure 28:
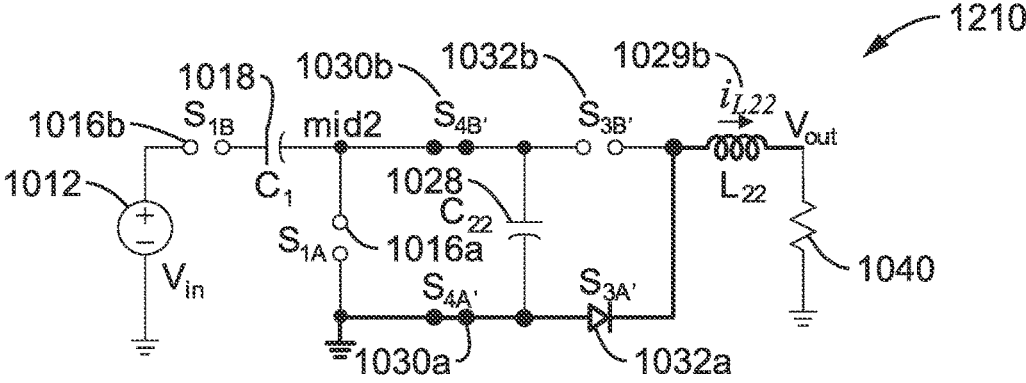
Figure 29:
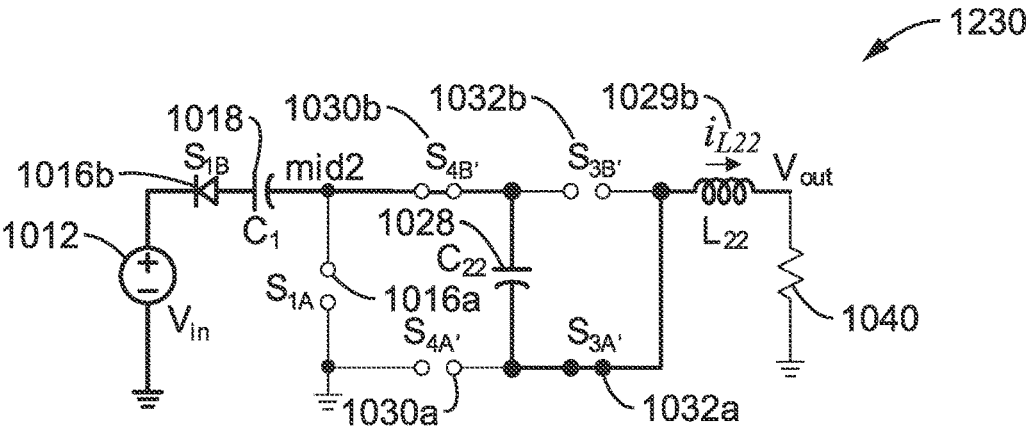
Figure 30:
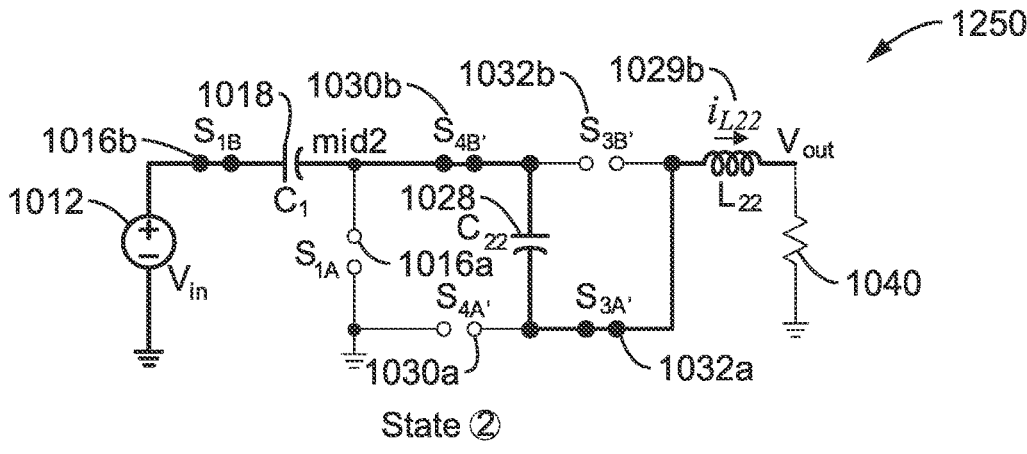
Figure 31:
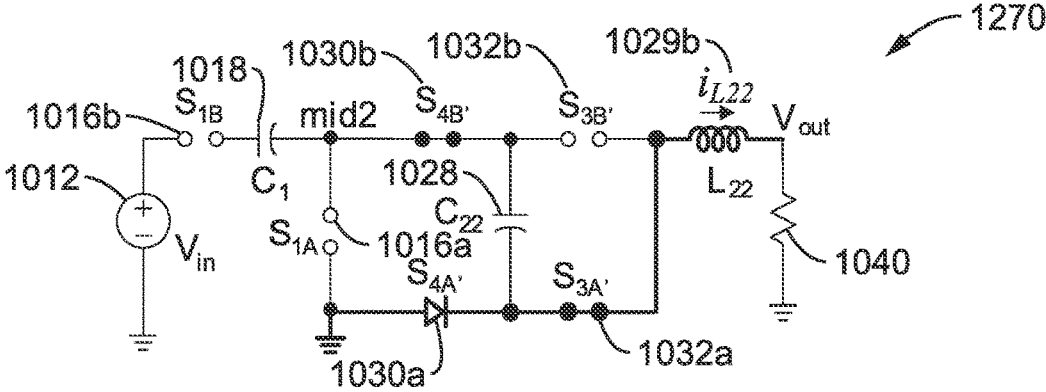
Figure 32:
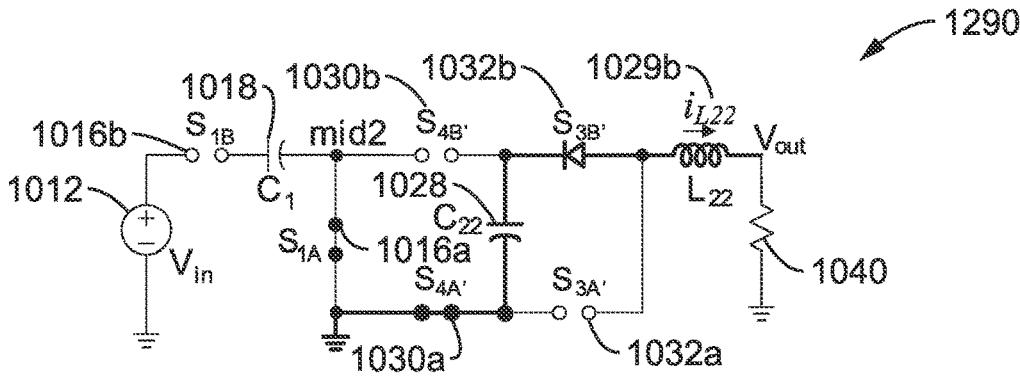

In FIG. 27 the high-side switch S3B' 1032b and low side switch S4A' 1030a are on. Going into FIG. 28, high-side switch S3B' 1032b is turned off at $t_4$, and the positive current $i_{L22}$ forces the body diode of S3A' to turn on, indicating ZVS of S3A'. Since the first-stage capacitor $C_1$ is floating from $t_3$ to $t_4$, the first-stage switch 51A can be turned off with zero current at $t_4$, and S4B' is turned on with zero current at $t_4$+Td. Although the Coss-related (output Capacitance Loss) cannot be omitted for S4B', the turn-on voltage Vin/4 is relatively low, and the overlap loss is eliminated in response to the zero-current turn on. After the inductor current $i_{L22}$ drops to a certain negative level, then moving into FIG. 29, the low-side switch S4A' 1030a is turned off at $t_5$, and the negative current assists zero-voltage turn on of S1B 1016b. Afterwards, as seen in FIG. 30, capacitors C1 1018 and C22 1028 resonate with $L_{22}$. The first-stage switch 51B is turned off at $t_6$, and the positive current $i_{L22}$ forces the body diode of S4A' to turn on as seen in FIG. 31, indicating ZVS of S4A' 1030a. The first-stage capacitor C1 1018 becomes floating, and the current iC1 is zero during t6-t7. Thus, moving into FIG. 32 the switch S4B' 1030b can be turned off with zero current at t7, and S1A is turned on with zero current at t7+Td. During the $T_{ZVS}$ interval, the inductor current $i_{L22}$ drops linearly. The switch S3A' is turned off at t7, and the negative $i_{L22}$ forces the body diode of S3B' 1032b to turn on, indicating ZVS of switch S3B'.

Figure 33:
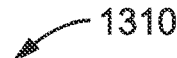
FIG. 33 through FIG. 36 are plots of waveforms from an experimental converter, according to at least one example embodiment of the present disclosure.
Figure 33:
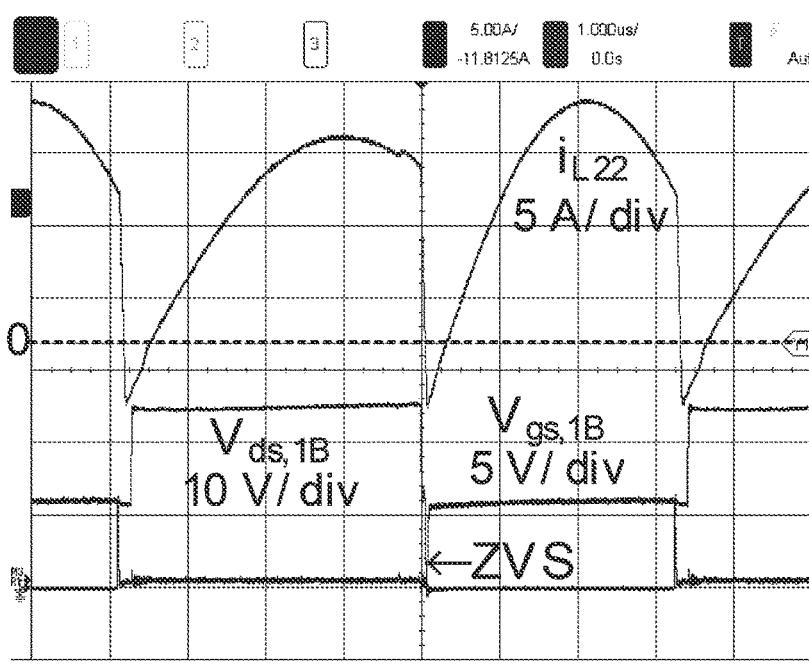
Figure 34:
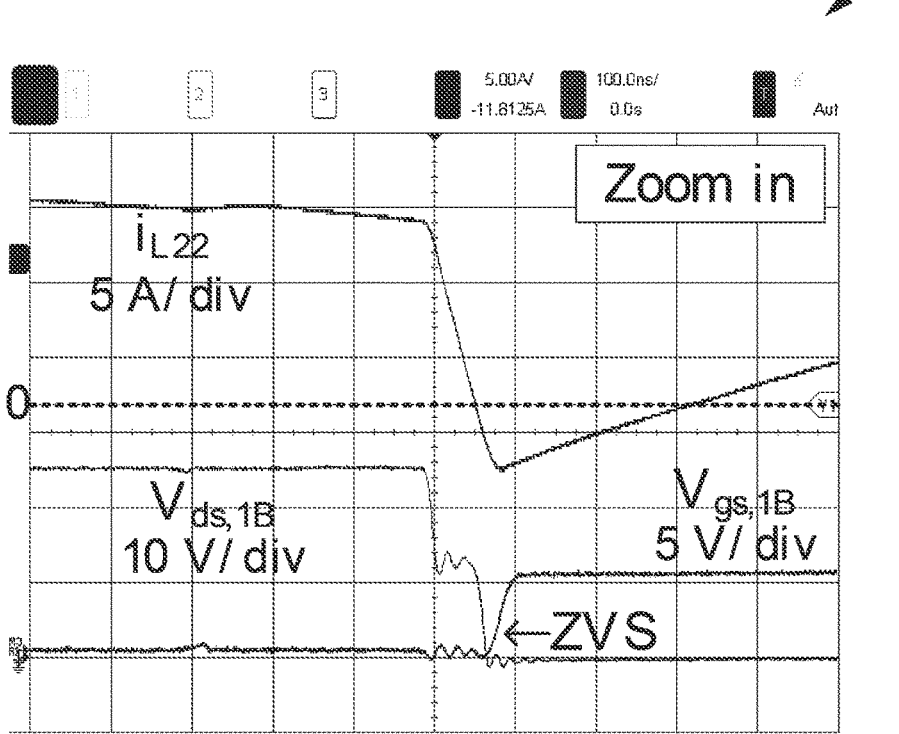
Figure 35:
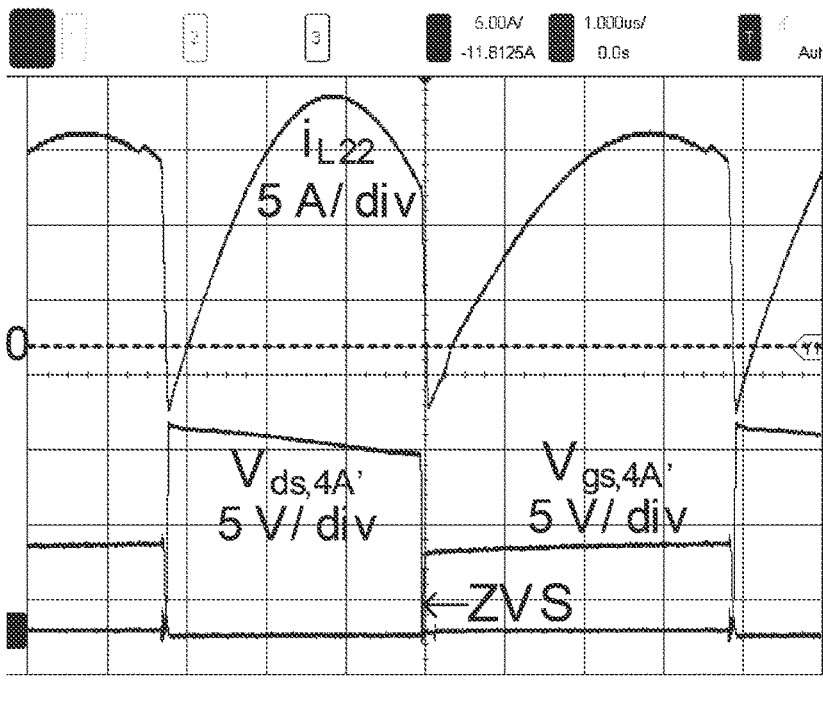
Figure 36:
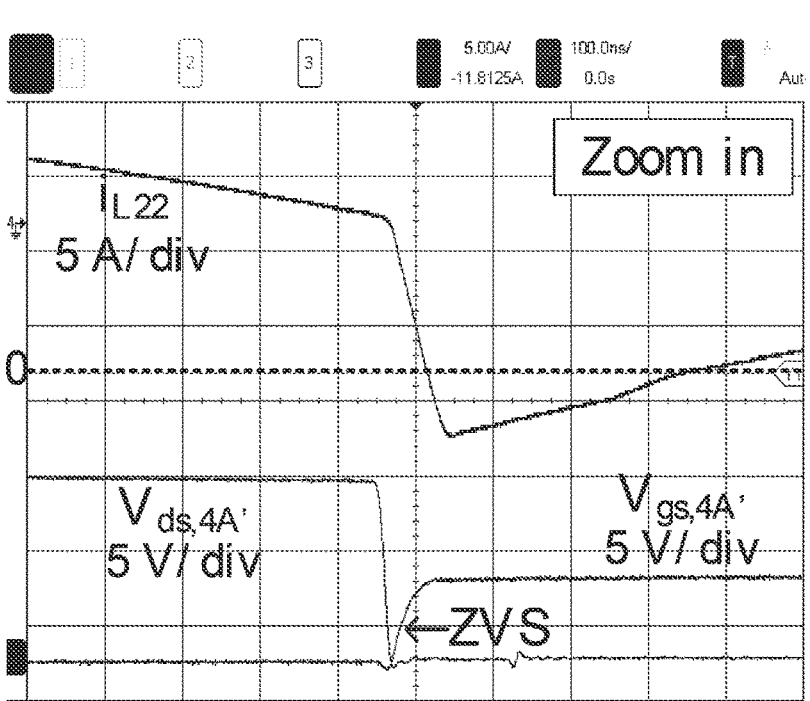

FIG. 33 through FIG. 36 illustrate 1310, 1330, 1350, 1370, converter experimental waveforms. In the plots of FIG. 33 and the zoomed area plots of FIG. 34, measured inductor current iii, drain-to-source voltage and gate voltage at $V_{in}$=48 V and $I_{out}$=20 A to demonstrate ZVS turn-on of high side switch S1B. Similarly, in the plots of FIG. 35 and the zoom in plot of FIG. 36, the same measurements are shown for the low side switch S4A'.

Accordingly, the ZVS operation has been verified experimentally. The measured inductor current, drain-to-source and gate-to-source voltages for the high-side MOSFET S1B and low-side MOSFET S4A' are turned on after the drain-to-source voltages drop to zero.

In summary, zero-voltage turn on is available for eight switches of the converter shown in FIG. 19, in the waveforms labeled in FIG. 20, while the other two switches S1A and S4B' are turned on and turned off with zero current, which is beneficial for high current applications.

It should be noted that switches S1A and S3B' can share the same PWM signal, and similarly switches S4B' and S3A' can share the same PWM signal. Only four PWM signals (S3B, S4B, S3A and S4A) are thus required as well as their 180-degree phase-shifted signals to drive this converter, whereby controller design is simplified.

Figures 37, 38:
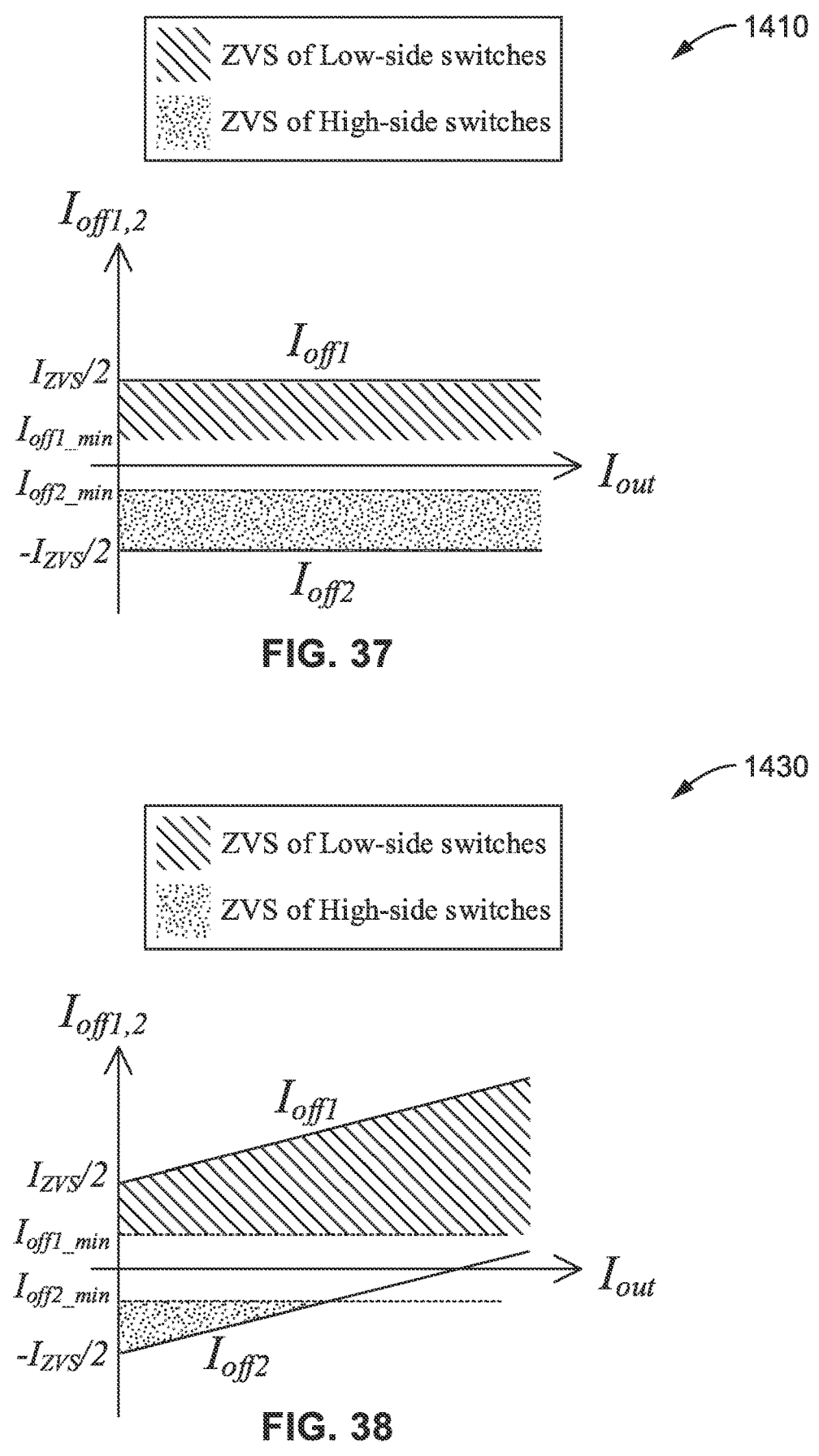
Figure 39:
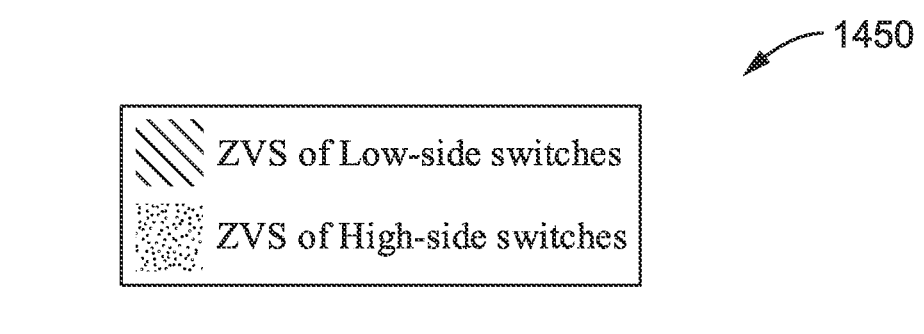
Figure 39:
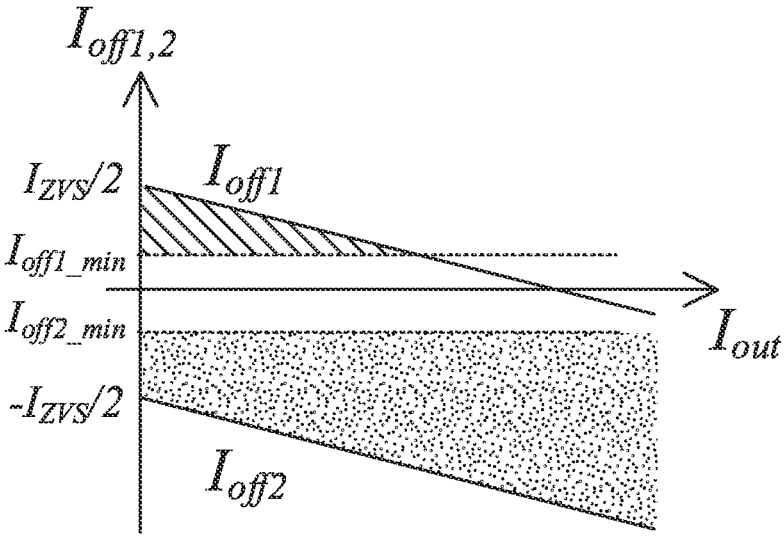

FIG. 37 through FIG. 39 illustrates example graphs 1410, 1430 and 1450, of Ioff1$_{min}$ and Ioff2$_{min}$ under different operating conditions.

In order to achieve ZVS operation, the inductor requires sufficient energy to discharge the switch node capacitance. The minimum inductor currents Ioff1$_{min}$ and Ioff2$_{min}$ are calculated by $$(LI_{off1\_min})^2 = (C_{oss,tot}V_{out})^2$$

$$(LI_{off2\_min})f = (C_{oss,tot}V_{out})^2.$$

where $C_{oss,tot}$ is the charge equivalent value of the output capacitance on the switches seen at the switching node. It will be noted that the effect of load current on the currents $I_{off1}$ and $I_{off2}$ depends on switching frequency. When the switching frequency equals the resonance frequency, the currents $I_{off1}$, and $I_{off2}$ are independent of load current, corresponding to the $I_{off1}$ $I_{off2}$ plot 1410 in FIG. 37. When the switching frequency is higher than the resonance, the currents $I_{off1}$, and $I_{off2}$ increase as $I_{out}$ increases as illustrated 1430 in FIG. 38. At heavy loads, $I_{off2}$ may exceed 0 A, and the high-side switches S1B, S3B', S4B, and S3B thus lose ZVS. When the switching frequency is lower than resonance, the high-side switches can achieve ZVS within the entire load range, and the low-side switches S3A, S4A, S3A', and S4A' will lose ZVS at heavy load as seen in 1450 of FIG. 39.

The ZVS mode is also applicable for other switched-bus converters when the second stage is composed of 2-to-1 converters as shown in FIG. 13. The circuit is configured to turn off the current connected to the input 472 of FIG. 13 when inductor current is positive, so that the low-side switch 476 can realize ZVS. When inductor current decreases to a certain negative level, then the low-side switch 478 is turned off, and the negative inductor current can assist zero-voltage turn on of high-side switch 480.

5. General Scope of Embodiments

It will be appreciated that the cascaded resonant converter with switching bus described herein can be applied as intermediate bus converters for the applications with stringent requirement of power density and efficiency such as high-performance computing and high bandwidth communications.

Embodiments of the present technology may be described herein with reference to flowchart illustrations of methods and systems according to embodiments of the technology, and/or procedures, algorithms, steps, operations, formulae, or other computational depictions, which may also be implemented as computer program products. In this regard, each block or step of a flowchart, and combinations of blocks (and/or steps) in a flowchart, as well as any procedure, algorithm, step, operation, formula, or computational depiction can be implemented by various means, such as hardware, firmware, and/or software including one or more computer program instructions embodied in computer-readable program code. As will be appreciated, any such computer program instructions may be executed by one or more computer processors, including without limitation a general purpose computer or special purpose computer, or other programmable processing apparatus to produce a machine, such that the computer program instructions which execute on the computer processor(s) or other programmable processing apparatus create means for implementing the function(s) specified.

Accordingly, blocks of the flowcharts, and procedures, algorithms, steps, operations, formulae, or computational depictions described herein support combinations of means for performing the specified function(s), combinations of steps for performing the specified function(s), and computer program instructions, such as embodied in computer-readable program code logic means, for performing the specified function(s). It will also be understood that each block of the flowchart illustrations, as well as any procedures, algorithms, steps, operations, formulae, or computational depictions and combinations thereof described herein, can be implemented by special purpose hardware-based computer systems which perform the specified function(s) or step(s), or combinations of special purpose hardware and computer-readable program code.

Furthermore, these computer program instructions, such as embodied in computer-readable program code, may also be stored in one or more computer-readable memory or memory devices that can direct a computer processor or other programmable processing apparatus to function in a particular manner, such that the instructions stored in the computer-readable memory or memory devices produce an article of manufacture including instruction means which implement the function specified in the block(s) of the flowchart(s). The computer program instructions may also be executed by a computer processor or other programmable processing apparatus to cause a series of operational steps to be performed on the computer processor or other programmable processing apparatus to produce a computer-implemented process such that the instructions which execute on the computer processor or other programmable processing apparatus provide steps for implementing the functions specified in the block(s) of the flowchart(s), procedure (s) algorithm(s), step(s), operation(s), formula(e), or computational depiction(s).

It will further be appreciated that the terms "programming" or "program executable" as used herein refer to one or more instructions that can be executed by one or more computer processors to perform one or more functions as described herein. The instructions can be embodied in software, in firmware, or in a combination of software and firmware. The instructions can be stored local to the device in non-transitory media, or can be stored remotely such as on a server, or all or a portion of the instructions can be stored locally and remotely. Instructions stored remotely can be downloaded (pushed) to the device by user initiation, or automatically based on one or more factors.

It will further be appreciated that as used herein, the terms processor, hardware processor, computer processor, central processing unit (CPU), and computer are used synonymously to denote a device capable of executing the instructions and communicating with input/output interfaces and/or peripheral devices, and that the terms processor, hardware processor, computer processor, CPU, and computer are intended to encompass single or multiple devices, single core and multicore devices, and variations thereof.

From the description herein, it will be appreciated that the present disclosure encompasses multiple implementations of the technology which include, but are not limited to, the following:

A resonant switched-capacitor converter apparatus, the apparatus comprising: (a) a first-stage comprising a switched-capacitor (SC) converter; and (b) a second-stage comprising at least one multi-resonant switched-capacitor (SC) converter; and (c) wherein the second-stage is connected to the first-stage through at least one intermediate switching bus.

A resonant switched-capacitor converter apparatus, the apparatus comprising: (a) a first-stage comprising a switched-capacitor (SC) converter; (b) wherein the first stage is configured with a 2-to-1 step down conversion ratio in which power is received and passed through parallel switches connected to a first capacitor, wherein on an output side of the first capacitor is another pair of parallel switches whose outputs are mid-converter outputs, mid1 and mid2; and (c) a second-stage comprising at least one multi-resonant switched-capacitor (SC) converter; (d) wherein the second stage comprises two phases of 2-to-1 step down converters, each receiving one of the mid-converter outputs to a second capacitor, the other end of which is coupled through a switch to ground; and (e) wherein each output side connection of the second capacitor pass through a switch and then are connected to a common inductor having an output connected between the two phases of the second stage, and coupled to output capacitors for driving a load at the output which provides a 4-to-1 conversion ratio.

The apparatus of any preceding implementation, wherein said first-stage comprises a pure switched-capacitor (SC) stage; and said second-stage comprises a multi-phase resonant switched-capacitor (SC) stage; and wherein a plurality of switching buses intermediate between said first-stage and said second-stage.

The apparatus of any preceding implementation, wherein the first-stage comprises two switches and one flying capacitor.

The apparatus of any preceding implementation, wherein the second-stage comprises two circuit phases, and wherein each said phase of the second-stage comprises three switches, one flying capacitor, and one resonant inductor;

The apparatus of any preceding implementation, wherein the first-stage and the second-stage each operate with two phases of switching control.

The apparatus of any preceding implementation, wherein the apparatus is driven with pulse-width modulation (PWM) drive signals.

The apparatus of any preceding implementation, wherein switching frequency and duty ratio in controlling the switching of said first and second stage circuitry approximately matches a resonant frequency of inductor-capacitor (LC) tank circuits operated by different operating phases within said first and second stages.

The apparatus of any preceding implementation, wherein an intermediate switching bus, providing multiple mid-converter outputs, connect between the first-stage switched-capacitor (SC) converter and the second-stage having multiple phases of resonant switched-capacitor (SC) converters.

The apparatus of any preceding implementation, wherein the second-stage is configured utilizing a dc bus instead of an intermediate switching bus, which reduces the number of switches required in comparison to conventional converter topologies.

The apparatus of any preceding implementation, wherein the first-stage and the second-stage include flying capacitors that share output inductors to provide soft charging.

The apparatus of any preceding implementation, wherein the first-stage has an N step down ratio and K outputs.

The apparatus of any preceding implementation, wherein the second-stage has an M step down ratio.

The apparatus of any preceding implementation, wherein each first-stage output is connected to one phase circuit in the second-stage.

The apparatus of any preceding implementation, wherein the switch, or switches, at each first-stage output are switched on only when the corresponding connected phase circuit of the second-stage is operating in an operating phase of obtaining energy from the intermediate switching bus.

The apparatus of any preceding implementation, wherein the switching-bus has points mid1, mid2 through to mid K, each of which provide a phase shift.

The apparatus of any preceding implementation, wherein the first-stage may be implemented using a switching-capacitor topology selected from the group of topologies consisting of Dickson, Series-Parallel, and Fibonacci.

The apparatus of any preceding implementation, wherein said apparatus is a 4-to-1 resonant switched-capacitor converter comprising: (a) wherein the first stage is configured with a 2-to-1 step down conversion ratio in which power is received and passed through parallel switches connected to a first capacitor, wherein on an output side of the first capacitor is another pair of parallel switches whose outputs are mid-converter outputs, mid1 and mid2; and (b) wherein the second stage comprises two phases of 2-to-1 step down converters, each receiving one of the mid-converter outputs to a second capacitor, the other end of which is coupled through a switch to ground; (c) wherein each output side connection of the second capacitor pass through a switch and then are connected to a common inductor having an output connected between the two phases of the second stage, and coupled to output capacitors for driving a load at the output of the 4-to-1 resonant switched-capacitor converter.

The apparatus of any preceding implementation, wherein the first-stage and the second-stage are each controlled by two periodic phase signals, wherein in a first half cycle of a period switches are activated for charging an LC tank circuit, while in a second half cycle of the period the LC tank circuit is discharged into the load.

The apparatus of any preceding implementation, wherein the first stage and the second stage are synchronized and operated by drive signals at an identical switching frequency.

The apparatus of any preceding implementation: (a) wherein a duty ratio, D, of the drive signals is determined by a ratio of resonant frequencies at different operating phases; and (b) wherein zero-current switching is provided when the switching frequency matches the resonant frequency.

The apparatus of any preceding implementation: (a) wherein the first-stage has an N step down ratio and K outputs, wherein power is input through switches, connected in series to each of K phase circuits; (b) wherein each said switch of a first K−1 circuit phases connects to a first end of a flying capacitor for that circuit phase; (c) wherein series switches and grounding switches, for each circuit phase of the first K−1 circuit phases, are coupled from a second end of each flying capacitor to one of multiple mid-converter outputs; and (d) wherein a final K circuit phase receives power from a last of the switches connected in series, and passes this through a series switch to its respective phase circuit output.

The apparatus of any preceding implementation, wherein the second-stage comprises M circuit phases to provide a step-down ratio of M.

The apparatus of any preceding implementation, wherein each of the M circuit phases of the second stage comprises: (a) a power input coupled to a first circuit sub-phase of the second stage; (b) a series of switches connected from the power input at said first circuit sub-phase to subsequent circuit sub-phases; (c) a flying capacitor having a first connection receiving power in all but the last of the subsequent circuit sub-phases; (d) a series switch connected to a second connection of the flying capacitor, in all but the last of the subsequent circuit sub-phases, with an output connected to an output inductor for the circuit phase; (e) a grounding switch connected to the second connection of the flying capacitor, in all but the last of the subsequent circuit sub-phases; (f) wherein the last of the subsequent circuit sub-phases receives power to a series switch to the output inductor for the circuit phase.

The apparatus of any preceding implementation, wherein the first-stage is configured with a series-parallel topology.

The apparatus of any preceding implementation, wherein said first-stage series-parallel topology has circuitry comprising: (a) wherein a power input is received through a series of flying capacitors interconnected with switches between each circuit phase; (b) a switch connecting from an input side of each flying capacitor to a mid-converter output for that circuit phase; and (c) a grounding switch connected to each output side of each flying capacitor.

The apparatus of any preceding implementation, wherein the first-stage is configured with a Fibonacci topology.

The apparatus of any preceding implementation, wherein said first-stage Fibonacci topology has circuitry comprising: (a) wherein a power input is received through a series of flying capacitors interconnected with switches from an input to a first circuit phase output; (b) a series of switches connecting from an input side of each flying capacitor to an input side of the subsequent flying capacitor, then coupled through a switch to a second circuit phase output; and (c) a grounding switch connected to each output side of each flying capacitor.

The apparatus of any preceding implementation, wherein the converter can operate at zero-voltage switching mode if the following conditions are met: (a) the converter apparatus is configured so that inductor current has a resonant (sinusoidal) region and a linear region; (b) the linear region of the inductor current starts at a positive point of inductor current and ends at a negative point of inductor current; (c) the high-side switches are turned off at the positive inductor current, and the low-side switches are then turned on with zero voltage; and (d) the low-side switches are turned off at the negative inductor current, and then at least some of the high-side switches are turned on with zero voltage.

As used herein, the term "implementation" is intended to include, without limitation, embodiments, examples, or other forms of practicing the technology described herein.

As used herein, the singular terms "a," "an," and "the" may include plural referents unless the context clearly dictates otherwise. Reference to an object in the singular is not intended to mean "one and only one" unless explicitly so stated, but rather "one or more."

Phrasing constructs, such as "A, B and/or C", within the present disclosure describe where either A, B, or C can be present, or any combination of items A, B and C. Phrasing constructs indicating, such as "at least one of" followed by listing a group of elements, indicates that at least one of these groups of elements is present, which includes any possible combination of the listed elements as applicable.

References in this disclosure referring to "an embodiment", "at least one embodiment" or similar embodiment wording indicates that a particular feature, structure, or characteristic described in connection with a described embodiment is included in at least one embodiment of the present disclosure. Thus, these various embodiment phrases are not necessarily all referring to the same embodiment, or to a specific embodiment which differs from all the other embodiments being described. The embodiment phrasing should be construed to mean that the particular features, structures, or characteristics of a given embodiment may be combined in any suitable manner in one or more embodiments of the disclosed apparatus, system, or method.

As used herein, the term "set" refers to a collection of one or more objects. Thus, for example, a set of objects can include a single object or multiple objects.

Relational terms such as first and second, top and bottom, upper and lower, left and right, and the like, may be used solely to distinguish one entity or action from another entity or action without necessarily requiring or implying any actual such relationship or order between such entities or actions.

The terms "comprises," "comprising," "has", "having," "includes", "including," "contains", "containing" or any other variation thereof, are intended to cover a non-exclusive inclusion, such that a process, method, article, apparatus, or system, that comprises, has, includes, or contains a list of elements does not include only those elements but may include other elements not expressly listed or inherent to such process, method, article, apparatus, or system. An element proceeded by "comprises . . . a", "has . . . a", "includes . . . a", "contains . . . a" does not, without more constraints, preclude the existence of additional identical elements in the process, method, article, apparatus, or system, that comprises, has, includes, contains the element.

As used herein, the terms "approximately", "approximate", "substantially", "essentially", and "about", or any other version thereof, are used to describe and account for small variations. When used in conjunction with an event or circumstance, the terms can refer to instances in which the event or circumstance occurs precisely as well as instances in which the event or circumstance occurs to a close approximation. When used in conjunction with a numerical value, the terms can refer to a range of variation of less than or equal to ±10% of that numerical value, such as less than or equal to ±5%, less than or equal to ±4%, less than or equal to ±3%, less than or equal to ±2%, less than or equal to ±1%, less than or equal to ±0.5%, less than or equal to ±0.1%, or less than or equal to ±0.05%. For example, "substantially" aligned can refer to a range of angular variation of less than or equal to ±10°, such as less than or equal to ±5°, less than or equal to ±4°, less than or equal to ±3°, less than or equal to ±2°, less than or equal to ±1°, less than or equal to ±0.5°, less than or equal to ±0.1°, or less than or equal to ±0.05°.

Additionally, amounts, ratios, and other numerical values may sometimes be presented herein in a range format. It is to be understood that such range format is used for convenience and brevity and should be understood flexibly to include numerical values explicitly specified as limits of a range, but also to include all individual numerical values or sub-ranges encompassed within that range as if each numerical value and sub-range is explicitly specified. For example, a ratio in the range of about 1 to about 200 should be understood to include the explicitly recited limits of about 1 and about 200, but also to include individual ratios such as about 2, about 3, and about 4, and sub-ranges such as about 10 to about 50, about 20 to about 100, and so forth.

The term "coupled" as used herein is defined as connected, although not necessarily directly and not necessarily mechanically. A device or structure that is "configured" in a certain way is configured in at least that way, but may also be configured in ways that are not listed.

Benefits, advantages, solutions to problems, and any element(s) that may cause any benefit, advantage, or solution to occur or become more pronounced are not to be construed as a critical, required, or essential feature or element of the technology described herein or any or all the claims.

In addition, in the foregoing disclosure various features may be grouped together in various embodiments for the purpose of streamlining the disclosure. This method of disclosure is not to be interpreted as reflecting an intention that the claimed embodiments require more features than are expressly recited in each claim. Inventive subject matter can lie in less than all features of a single disclosed embodiment.

The abstract of the disclosure is provided to allow the reader to quickly ascertain the nature of the technical disclosure. It is submitted with the understanding that it will not be used to interpret or limit the scope or meaning of the claims.

It will be appreciated that the practice of some jurisdictions may require deletion of one or more portions of the disclosure after the application is filed. Accordingly, the reader should consult the application as filed for the original content of the disclosure. Any deletion of content of the disclosure should not be construed as a disclaimer, forfeiture, or dedication to the public of any subject matter of the application as originally filed.

The following claims are hereby incorporated into the disclosure, with each claim standing on its own as a separately claimed subject matter.

Although the description herein contains many details, these should not be construed as limiting the scope of the disclosure, but as merely providing illustrations of some of the presently preferred embodiments. Therefore, it will be appreciated that the scope of the disclosure fully encompasses other embodiments which may become obvious to those skilled in the art.

All structural and functional equivalents to the elements of the disclosed embodiments that are known to those of ordinary skill in the art are expressly incorporated herein by reference and are intended to be encompassed by the present claims. Furthermore, no element, component, or method step in the present disclosure is intended to be dedicated to the public regardless of whether the element, component, or method step is explicitly recited in the claims. No claim element herein is to be construed as a "means plus function" element unless the element is expressly recited using the phrase "means for". No claim element herein is to be construed as a "step plus function" element unless the element is expressly recited using the phrase "step for".

What is claimed is:

1. A resonant switched-capacitor converter apparatus, the apparatus comprising:

a first-stage comprising a switched-capacitor (SC) converter; and a second-stage comprising at least one multi-resonant switched-capacitor (SC) converter;

wherein the second-stage is connected to the first-stage through at least one intermediate switching bus; and wherein said apparatus is a 4-to-1 resonant switched-capacitor converter comprising:

wherein the first stage is configured with a 2-to-1 step down conversion ratio in which power is received and passed through parallel switches connected to a first capacitor, wherein on an output side of the first capacitor is another pair of parallel switches whose outputs are mid-converter outputs, mid1 and mid2;

wherein the second stage comprises two phases of 2-to-1 step down converters, each receiving one of the mid-converter outputs to a second capacitor, an other end of which is coupled through a switch to ground; and wherein each output side connection of the second capacitor passes through a switch and then are connected to a common inductor having an output connected between the two phases of the second stage, and coupled to output capacitors for driving a load at the output of the 4-to-1 resonant switched-capacitor converter.

2. The apparatus of claim 1, wherein said first-stage comprises a pure switched-capacitor (SC) stage; and said second-stage comprises a multi-phase resonant switched-capacitor (SC) stage; and wherein the at least one switching bus intermediates between said first-stage and said second-stage.

3. The apparatus of claim 1, wherein the first-stage comprises two switches and one flying capacitor.

4. The apparatus of claim 1, wherein the second-stage comprises two circuit phases, and wherein each said phase of the second-stage comprises three switches, one flying capacitor, and one resonant inductor.

5. The apparatus of claim 1, wherein the first-stage and the second-stage each operate with two phases of switching control.

6. The apparatus of claim 1, wherein the apparatus is driven with pulse-width modulation (PWM) drive signals.

7. The apparatus of claim 1, wherein switching frequency and duty ratio in controlling switching of said first and second stage circuitry approximately matches a resonant frequency of inductor-capacitor (LC) tank circuits operated by different operating phases within said first and second stages.

8. The apparatus of claim 1, wherein the at least one intermediate switching bus, providing multiple mid-converter outputs, connects between the first-stage switched-capacitor (SC) converter and the second-stage having multiple phases of resonant switched-capacitor (SC) converters.

9. The apparatus of claim 1, wherein the first-stage and the second-stage include flying capacitors that share output inductors to provide soft charging.

10. The apparatus of claim 1, wherein the first-stage has an integer value N step down ratio and integer value of K outputs.

11. The apparatus of claim 1, wherein the second-stage has an integer value M step down ratio.

12. The apparatus of claim 1, wherein each first-stage output is connected to one phase circuit in the second-stage.

13. The apparatus of claim 1, wherein a switch, or switches, at each first-stage output are switched on only when corresponding connected phase circuit of the second-stage is operating in an operating phase of obtaining energy from the at least one intermediate switching bus.

14. The apparatus of claim 1, wherein the at least one intermediate switching bus has a plurality of outputs, each of which provide a phase shift.

15. The apparatus of claim 1, wherein the first-stage is implemented using a switching-capacitor topology selected from the group of topologies consisting of Dickson, Series-Parallel, and Fibonacci.

16. The apparatus of claim 1, wherein the first-stage and the second-stage are each controlled by two periodic phase signals, wherein in a first half cycle of a period switches are activated for charging an LC tank circuit, while in a second half cycle of the period the LC tank circuit is discharged into the load.

17. The apparatus of claim 16, wherein the first stage and the second stage are synchronized and operated by drive signals at an identical switching frequency.

18. The apparatus of claim 17:

wherein a duty ratio, D, of the drive signals is determined by a ratio of resonant frequencies at different operating phases; and wherein zero-current switching is provided when a switching frequency matches a resonant frequency.

19. The apparatus of claim 1:

wherein the first-stage has an integer value N step down ratio and an integer value of K outputs, wherein power is input through switches, connected in series to each of an integer value of K phase circuits;

wherein each said switch of an integer value of a first K−1 circuit phases connects to a first end of a flying capacitor for that circuit phase;

wherein series switches and grounding switches, for each circuit phase of the first K−1 circuit phases, are coupled from a second end of each flying capacitor to one of multiple mid-converter outputs; and wherein a final K circuit phase receives power from a last of the switches connected in series, and passes this through a series switch to its respective phase circuit output.

20. The apparatus of claim 1, wherein the second-stage comprises an integral number M of circuit phases to provide an integral step-down ratio of M.

21. The apparatus of claim 20, wherein each of the integral number of M circuit phases of the second stage comprises:

a power input coupled to a first circuit sub-phase of the second stage;

a series of switches connected from the power input at said first circuit sub-phase to subsequent circuit sub-phases;

a flying capacitor having a first connection receiving power in all but the last of the subsequent circuit sub-phases;

a series switch connected to a second connection of the flying capacitor, in all but the last of the subsequent circuit sub-phases, with an output connected to an output inductor for the circuit phase;

a grounding switch connected to the second connection of the flying capacitor, in all but the last of the subsequent circuit sub-phases;

wherein the last of the subsequent circuit sub-phases receives power to a series switch to the output inductor for the circuit phase.

22. The apparatus of claim 1, wherein the first-stage is configured with a series-parallel topology.

23. The apparatus of claim 22, wherein said first-stage series-parallel topology has circuitry comprising:

wherein a power input is received through a series of flying capacitors interconnected with switches between each circuit phase;

a switch connecting from an input side of each flying capacitor to a mid-converter output for that circuit phase; and a grounding switch connected to each output side of each flying capacitor.

24. The apparatus of claim 1, wherein the first-stage is configured with a Fibonacci topology.

25. The apparatus of claim 24, wherein said first-stage Fibonacci topology has circuitry comprising:

wherein a power input is received through a series of flying capacitors interconnected with switches from an input to a first circuit phase output;

a series of switches connecting from an input side of each flying capacitor to an input side of the subsequent flying capacitor, then coupled through a switch to a second circuit phase output; and a grounding switch connected to each output side of each flying capacitor.

26. A resonant switched-capacitor converter apparatus, the apparatus comprising:

(a) a first-stage comprising a switched-capacitor (SC) converter;

(b) wherein the first stage is configured with a 2-to-1 step down conversion ratio in which power is received and passed through parallel switches connected to a first capacitor, wherein on an output side of the first capacitor is another pair of parallel switches whose outputs are mid-converter outputs, mid1 and mid2; and (c) a second-stage comprising at least one multi-resonant switched-capacitor (SC) converter;

(d) wherein the second stage comprises two phases of 2-to-1 step down converters, each receiving one of the mid-converter outputs to a second capacitor, an other end of which is coupled through a switch to ground; and (e) wherein each output side connection of the second capacitor passes through a switch and then are connected to a common inductor having an output connected between the two phases of the second stage, and coupled to output capacitors for driving a load at the output which provides a 4-to-1 conversion ratio.

27. The apparatus of claim 26, wherein the converter can operate in a zero-voltage switching mode if the following conditions are met:

(a) the converter apparatus is configured so that inductor current has a resonant (sinusoidal) region and a linear region;

(b) the linear region of the inductor current starts at a positive point of inductor current and ends at a negative point of inductor current;

(c) high-side switches are turned off at the positive inductor current, and the low-side switches are then turned on with zero voltage; and (d) low-side switches are turned off at the negative inductor current, and then at least some of the high-side switches are turned on with zero voltage.

\* \* \* \* \*